(12) United States Patent
Roberts et al.

(10) Patent No.: US 9,389,749 B2
(45) Date of Patent: Jul. 12, 2016

(54) SYSTEMS AND METHODS FOR PRESENTING MEDIA PROGRAM ACCESSIBILITY INFORMATION IN A MEDIA PROGRAM BROWSE VIEW

(71) Applicant: Verizon and Redbox Digital Entertainment Services, LLC, Basking Ridge, NJ (US)

(72) Inventors: Brian F. Roberts, Dallas, TX (US); Imran Arif Maskatia, Palo Alto, CA (US); Paul Bradley Bowers, Winfield, IL (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 50 days.

(21) Appl. No.: 14/093,285

(22) Filed: Nov. 29, 2013

(65) Prior Publication Data
US 2014/0157329 A1    Jun. 5, 2014

Related U.S. Application Data

(60) Provisional application No. 61/732,247, filed on Nov. 30, 2012.

(51) Int. Cl.
| | | |
|---|---|---|
| *H04N 5/445* | (2011.01) |
| *G06F 3/0481* | (2013.01) |
| *H04L 29/08* | (2006.01) |
| *G06F 3/0482* | (2013.01) |
| *H04N 21/4722* | (2011.01) |
| *H04N 21/472* | (2011.01) |
| *H04N 21/218* | (2011.01) |
| *H04N 21/482* | (2011.01) |
| *H04N 21/27* | (2011.01) |
| *G06Q 30/02* | (2012.01) |
| *G06Q 30/06* | (2012.01) |
| *H04N 21/2543* | (2011.01) |
| *H04N 21/488* | (2011.01) |

(52) U.S. Cl.
CPC ............ *G06F 3/0481* (2013.01); *G06F 3/0482* (2013.01); *G06Q 30/02* (2013.01); *G06Q 30/0607* (2013.01); *G06Q 30/0609* (2013.01); *H04L 67/10* (2013.01); *H04N 21/218* (2013.01); *H04N 21/2543* (2013.01); *H04N 21/27* (2013.01); *H04N 21/472* (2013.01); *H04N 21/4722* (2013.01); *H04N 21/47202* (2013.01); *H04N 21/47214* (2013.01); *H04N 21/482* (2013.01); *H04N 21/4882* (2013.01)

(58) Field of Classification Search
None
See application file for complete search history.

(56) References Cited

U.S. PATENT DOCUMENTS

| | | | | |
|---|---|---|---|---|
| 7,386,806 B2 * | 6/2008 | Wroblewski | ................ | 715/788 |
| 7,703,116 B1 * | 4/2010 | Moreau et al. | ................ | 725/44 |
| 8,584,165 B1 * | 11/2013 | Kane et al. | ................ | 725/44 |

(Continued)

*Primary Examiner* — Fernando Alcon

(57) ABSTRACT

An exemplary method includes a media service provider system 1) providing for display in a media program browse view on a display screen, a cover art image object representing a media program within a grid of cover art image objects representing a plurality of media programs accessible through a media program distribution service, 2) determining a media distribution model by way of which the media program represented by the cover art image object is accessible through the media program distribution service, and 3) providing, for display in the media program browse view together with the cover art image object, an accessibility indicator that indicates the media distribution model by way of which the media program is accessible. Corresponding systems and methods are also described.

20 Claims, 15 Drawing Sheets

(56) References Cited

U.S. PATENT DOCUMENTS

2004/0172661 A1* 9/2004 Yagawa et al. ................ 725/131
2006/0250358 A1* 11/2006 Wroblewski .......... G06F 3/0346
                                                    345/157
2011/0289522 A1* 11/2011 Pontual ............ H04N 21/23895
                                                    725/1
2012/0158478 A1*  6/2012 Holder ....................... 705/14.19
2013/0263185 A1* 10/2013 Wood et al. ..................... 725/56

* cited by examiner

SYSTEMS AND METHODS FOR PRESENTING MEDIA PROGRAM ACCESSIBILITY INFORMATION IN A MEDIA PROGRAM BROWSE VIEW

RELATED APPLICATIONS

The present application claims priority under 35 U.S.C. §119(e) to U.S. Provisional Patent Application No. 61/732,247, filed Nov. 30, 2012. The contents of the provisional patent application are hereby incorporated by reference in their entirety.

BACKGROUND INFORMATION

There are diverse ways for people to find and consume media programs. For example, a user wanting to watch a media program such as a movie may utilize a traditional video distribution service such as a video rental or purchase service ("video service") to find, access, and watch the movie. The video service may allow the user to rent or purchase a physical copy of the movie from a local video store or media vending kiosk, or to rent or purchase a digital copy of the movie through an online video service, which may stream or download the digital copy of the movie to a user computing device for playback to the user.

Such a video service typically provides a user of the service with tools for discovering and accessing a media program, such as user interface tools that provide information about the media program and facilitate access to the media program by the user. However, there remains room for new and/or improved user interface tools and/or features that may further benefit users of the service.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary systems and methods for presenting media program accessibility information in a media program browse view ("browse view") are disclosed. In certain examples, systems and methods described herein may provide a browse view of a graphical user interface ("GUI"). The browse view may include a plurality (e.g., a grid) of cover art image objects that represent media programs available for access through a media program distribution service. The browse view may further include accessibility information displayed together with the cover art image objects. The accessibility information may include information about one or more of the media programs represented by the cover art image objects in the browse view. For example, the accessibility information may indicate how one or more of the media programs have been accessed and/or are available for access by a user through the media program distribution service.

As an example, the accessibility information may include an accessibility indicator displayed together with a cover art image object and that indicates a media distribution model by way of which a media program represented by the cover art image object is accessible through the media program distribution service. Examples of such accessibility indicators are described herein.

As another example, the accessibility information may include a status indicator displayed together with a cover art image object and that indicates a status of a media program represented by the cover art image object with respect to a user and a media distribution model by way of which the media program is accessible through the media program distribution service. Examples of such status indicators are described herein.

The accessibility information in the browse view may facilitate a convenient, intuitive, and/or efficient assessment by the user of the various options available for accessing the media programs and a determination by the user of which option best fits the preferences of the user. These and/or additional or alternative benefits and/or advantages that may be provided by one or more of the exemplary systems and methods described herein will be made apparent herein. Exemplary systems and methods for presenting media program accessibility information in a browse view and implementations thereof, as well as exemplary GUI views (e.g., exemplary browse views) will now be described in reference to the accompanying drawings.

Figure 1:
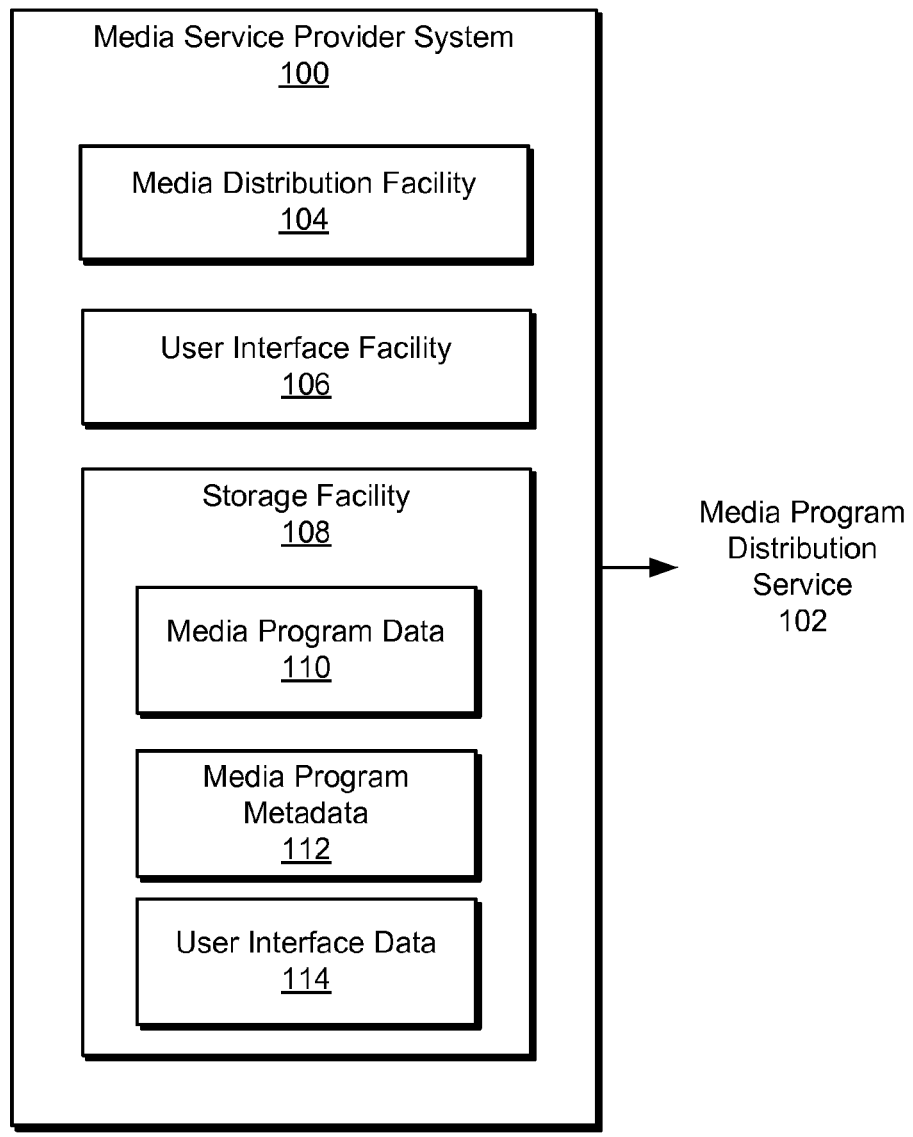
FIG. 1 illustrates an exemplary media service provider system according to principles described herein.

FIG. 1 illustrates an exemplary media service provider system 100 ("system 100"). System 100 may be configured to facilitate discovery, access, and/or consumption of media programs by one or more users. For example, system 100 may be configured to provide a media program distribution service 102 ("media service") to one or more end-users of the media service 102 (e.g., one or more subscribers to the media service 102). System 100 may be associated with (e.g., operated by) a provider of the media service ("service provider"). Through the media service 102, an end user of the media service 102 may discover, access, and/or consume media programs distributed by system 100.

As used herein, the term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service 102. Such media programs that are made available for user consumption by the media service 102 may be accessed and/or played back by an appropriately configured user computing device (e.g., a media player device) for presentation to the user.

As shown in FIG. 1, system 100 may include, without limitation, a media distribution facility 104 ("distribution facility 104"), a user interface facility 106, and a storage facility 108 selectively and communicatively coupled to one another. The facilities may be communicatively coupled one to another by any suitable communication technologies.

It will be recognized that although facilities 104-108 are shown to be separate facilities in FIG. 1, any of those facilities may be combined into a single facility or split into additional facilities as may serve a particular implementation. Additionally or alternatively, one or more of the facilities 104-108 may be omitted from and external to system 100 in other implementations. Facilities 104-108 will now be described in more detail.

Storage facility 108 may be configured to store media program data 110 representative of media programs that may be distributed by media distribution facility 104, media program metadata 112 for the media programs (e.g., metadata and/or enriched metadata descriptive of the media programs) represented by media program data 110, and user interface data 114 generated and/or used by user interface facility 106 to provide one or more user interfaces, such as described herein. Storage facility 108 may maintain additional or alternative data as may serve a particular implementation.

Distribution facility 104 may be configured to facilitate distribution of media programs to users of the media service 102 provided by system 100. Distribution facility 104 may be configured to facilitate distribution of media programs in any way and/or form that is suitable to facilitate access and consumption of the media programs by users of the media service 102.

In certain examples, distribution facility 104 may be configured to distribute media programs by way of multiple different media distribution channels. For example, distribution facility 104 may be configured to distribute media programs by way of a digital media distribution channel and a physical media distribution channel. The digital media distribution channel may include on-demand streaming and/or downloading of data representative of the media programs from a media service provider server system to one or more user computing systems by way of a network (e.g., an Internet Protocol ("IP") wide area network such as the Internet). The physical media distribution channel may include distribution of physical media that hold data representative of the media programs. For example, the physical media distribution channel may include a media vending kiosk-based distribution channel through which physical media, such as digital versatile discs ("DVDs"), BLU-RAY discs ("BDs"), and/or other physical computer-readable copies of media programs are distributed to users.

Figure 2:
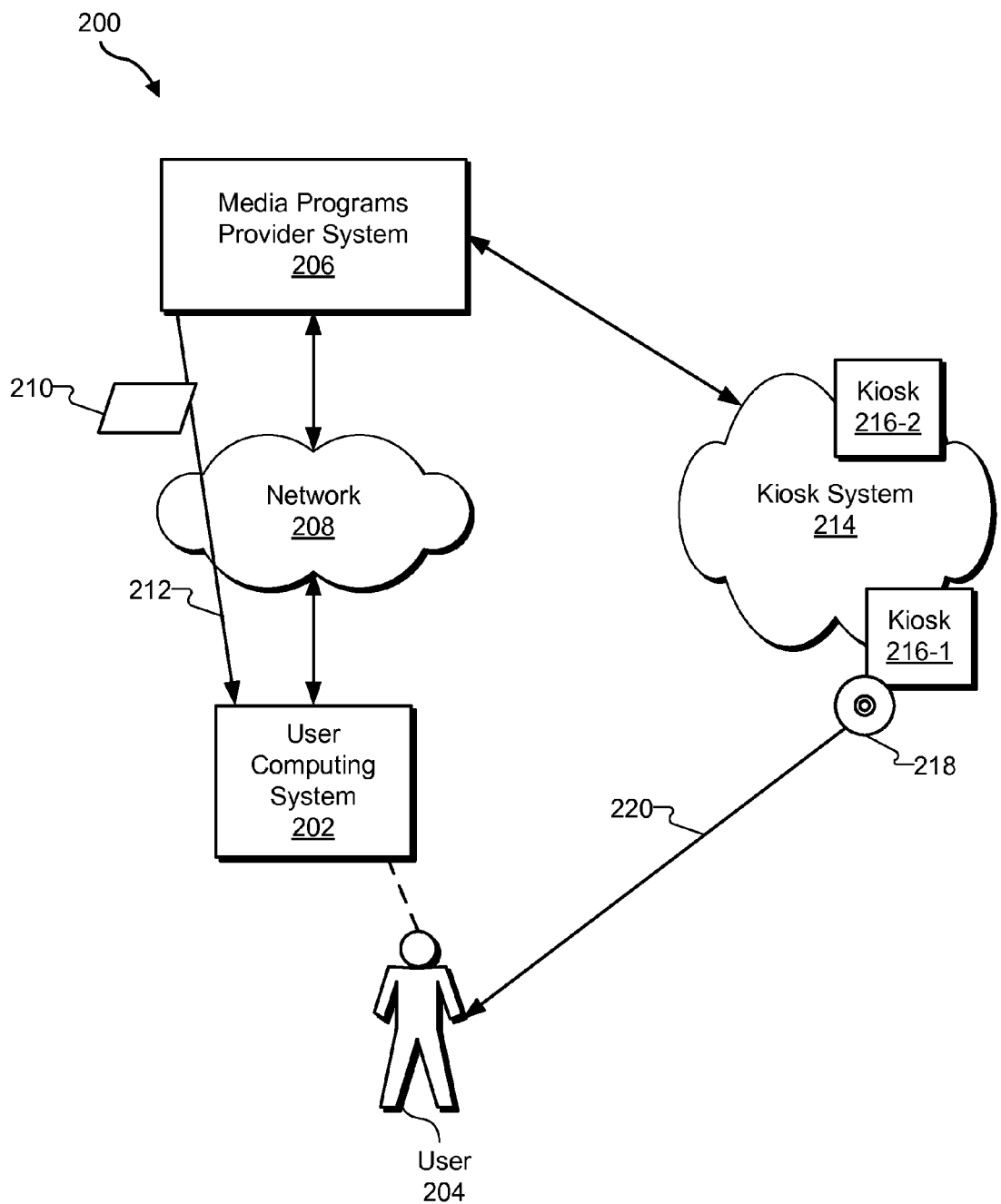
FIG. 2 illustrates an exemplary media distribution configuration in which the system of FIG. 1 may be implemented according to principles described herein.

FIG. 2 illustrates an exemplary media distribution configuration 200. Components of system 100 may be implemented by one or more of the elements of the configuration 200 shown in FIG. 2. As shown, the configuration 200 may include a user computing system 202 associated with a user 204, who may be an end user of the media service 102 provided by system 100. User computing system 202 may be in communication with a media programs provider system 206 ("provider system 206"), which may include one or more computing devices (e.g., server devices remotely located from user computing system 202 and/or operated by a provider of the media service 102).

User computing system 202 and provider system 206 may communicate using any communication platforms and technologies suitable for transporting data (e.g., media programs data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing system 202 and provider system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing system 202 and provider system 206. Communications between user computing system 202 and provider system 206 may be transported using any one of the above-listed networks, or any combination or sub-combination of the above-listed networks. Alternatively, user computing system 202 and provider system 206 may communicate in another way such as by direct connections between user computing system 202 and provider system 206.

The configuration 200 may support distribution of media programs, through the media service 102 provided by the system 100, by way of multiple different media distribution channels, such as a digital media distribution channel and a physical media distribution channel. As shown, provider system 206 may distribute media programs such as by distributing digital data 210 representative of a media program to user computing system 202 by way of a digital media distribution channel 212, which may be included as part of or utilized by a digital media distribution model. This distribution may utilize any suitable media streaming and/or downloading technologies (e.g., Internet media streaming and/or downloading technologies) to support delivery of digital data representative of media programs to user computing system 202 by way of network 208.

As further shown in FIG. 2, provider system 206 may be in communication with a media vending kiosk system 214, which may include one or more geographically distributed media vending kiosks 216 (e.g., media vending kiosks 216-1 and 216-2) configured to vend physical copies of media programs, such as a physical copy 218 of a media program, to user 204 by way of a physical media distribution channel 220, which may be included as part of or utilized by a physical media distribution model. For example, user 204 may visit a location of media vending kiosk 216-1 and, through the media vending kiosk 216-1, obtain the physical copy 218 of the media program, which may be experienced by the user in a variety of different ways, for example, by inserting the physical copy 218 into a media disc player device such as a DVD or BD player device. In certain examples, one or more of the vending kiosks 216 may include automated media vending machines.

User computing system 202 may be configured for use by user 204 associated with (e.g., operating) the user computing system 202 to access the media service 102 provided by system 100. For example, the user 204 may utilize the user computing system 202 to access one or more user interfaces provided by system 100 as part of and/or for accessing the media service, and to present the user interfaces for use by the user 204 to discover, access, and consume media programs distributed by way of the digital media distribution channel 210 and/or the physical media distribution channel 220 as part of the media service 102.

User computing system 202 may include one or more user computing devices associated with the user 204. Examples of such devices include, without limitation, a media player computing device (e.g., a media disc player device such as a DVD or BD player device), a display device, a set-top box device, a digital video recording ("DVR") device, a computer, a tablet computer, a smart phone device, and any other device capable of accessing the media service and/or media programs provided by system 100 by way of the media service 102.

In certain examples, user computing system 202 may include a first user computing device (e.g., a primary display device) configured to play back media programs and a second user computing device (e.g., a secondary or companion display device) configured to display a graphical user interface that may compliment or be used together with the playback of the media programs by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service) may be displayed. Such an example is illustrative only. Other examples of a user computing system 202 may include any combination of user computing devices or a single user computing device configured to perform any of the user computing system and/or device operations described herein.

Returning to FIG. 1, in certain examples, the distribution facility 104 may be configured to provide users of the media service with access to media programs by way of a plurality of different media distribution models ("distribution models"). Each distribution model may define a particular way that an end user of the media service may gain access to media programs through the media service. Thus, a user of the media service may be able to gain access to media programs by way of multiple different distribution models.

In certain examples, the distribution models may include multiple distribution-channel-based models such as a digital media distribution model that corresponds to or utilizes a digital media distribution channel and a physical media distribution model that corresponds to or utilizes a physical media distribution channel. For example, a digital media program distribution model may include or utilize the digital media distribution channel 212 of FIG. 2, and a physical media distribution model may include or utilize the physical media distribution channel 220 of FIG. 2.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media service 102 (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined by a service provider to be different for a rental and a purchase of the media program, in which case each of the rental and the purchase may be a different transaction-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

Figure 3:
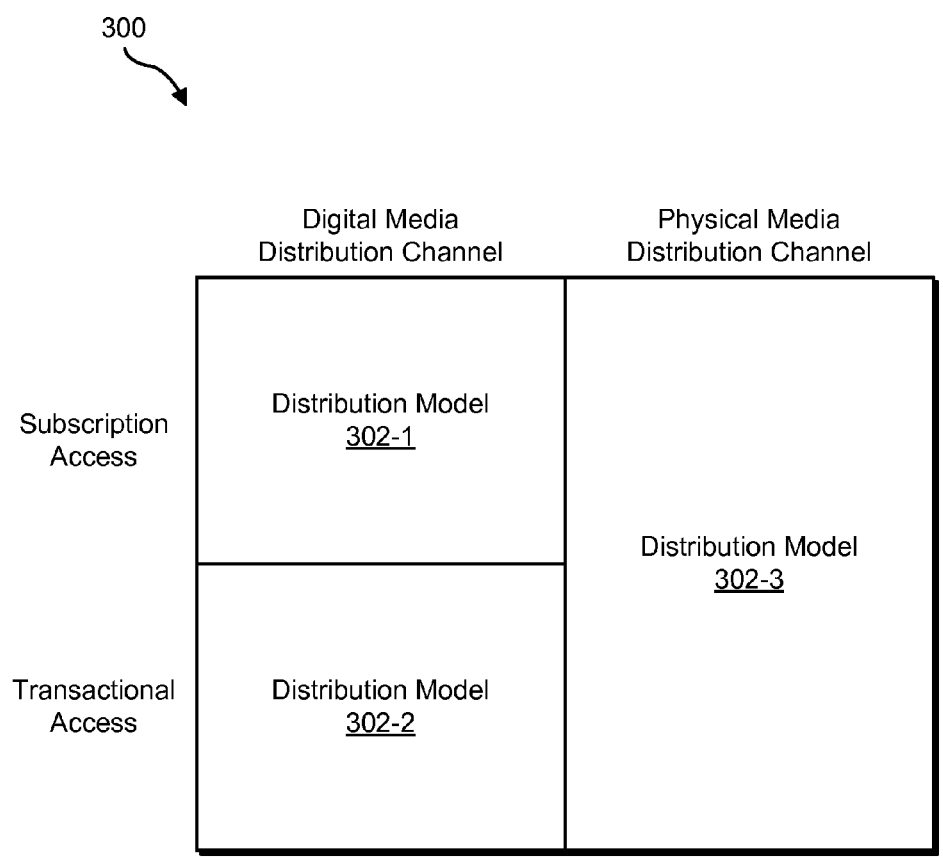
FIG. 3 illustrates a table representing an exemplary set of different media distribution models by way of which access to media programs may be provided by way of a media service according to principles described herein.

Distribution facility 104 may be configured to provide users of the media service 102 with access to media programs by way of any of the different distribution models described herein, or by way of any combination or sub-combination thereof. As an example, FIG. 3 illustrates a table 300 representing a set of different distribution models by way of which access to media programs may be provided through the media service 102 in certain implementations. As shown, the set of distribution models includes a first distribution model 302-1 associated with subscription-based access to media programs by way of a digital media distribution channel, a second distribution model 302-2 associated with transactional-based access to media programs by way of the digital media distribution channel, and a third distribution model 302-3 associated with either or both subscription-based or transactional-based access to media programs by way of a physical media distribution channel. In certain examples, these distribution models may be referred to as a "subscription" digital distribution model, an "on-demand" or "rent/buy" digital distribution model, and a "physical" or "kiosk" distribution model.

Media programs distributed by distribution facility 104 as part of media service 102 may be assigned to one or more of the distribution models provided by distribution facility 104. For example, certain media programs may be made available by way of all of the distribution models and certain media programs may be made available by way of only a subset of the distribution models (e.g., by way of only a subscription-based and digital channel-based distribution model, only a transaction-based and digital channel-based distribution model, only a physical channel-based distribution model, only a transaction-based distribution model, etc.).

In certain examples, assignments of media programs to distribution models may change over time. For example, for a first period of time, a media program may be distributed by way of distribution model 302-3 only. At the end of that period of time, the media program may leave distribution model 302-3, meaning that the media program is no longer accessible by way of distribution model 302-3. For a second period of time, however, the same media program may be distributed by way of distribution model 302-2 only. For example, when the media program leaves distribution model 302-3, the media program may be added to distribution model 302-2. At the end of the second period of time, the same media program may leave distribution model 302-2 and be assigned to distribution model 302-1. This example is illustrative only, a media program may be made accessible by way of different distribution models or specific combinations of distribution models for specific periods of time, and may be added to or removed from any distribution model in any suitable way.

Distribution facility 104 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

System 100 may be configured to provide one or more tools to facilitate user discovery of media programs distributed by distribution facility 104 through the media service 102. The discovery may include discovery of information about media programs, including information representative of distribution models by way of which the media programs are accessible through media service 102 and/or other information about the media programs that is specific to one or more of the distribution models. To this end, system 100 may maintain and/or access data representative of information about media programs distributed by distribution facility 104.

Returning to FIG. 1, user interface facility 106 may be configured to provide a user interface through which users may access and interface with the media service 102 provided by system 100 to discover, access, and/or consume media programs. The user interface may be in any suitable form. For example, user interface facility 106 may be configured to provide a website, a client application user interface (e.g., a user interface provided by a client application such as a "mobile app" installed and running on user computing system 202), a media player user interface, a GUI, and/or any other form of user interface configured to facilitate user interaction with the media service. User interface facility 106 may be configured to provide any of the exemplary user interfaces illustrated herein, including one or more media service user interface views that include one or more accessibility indicators and/or status indicators associated with accessing media programs through different distribution models.

Figure 4:
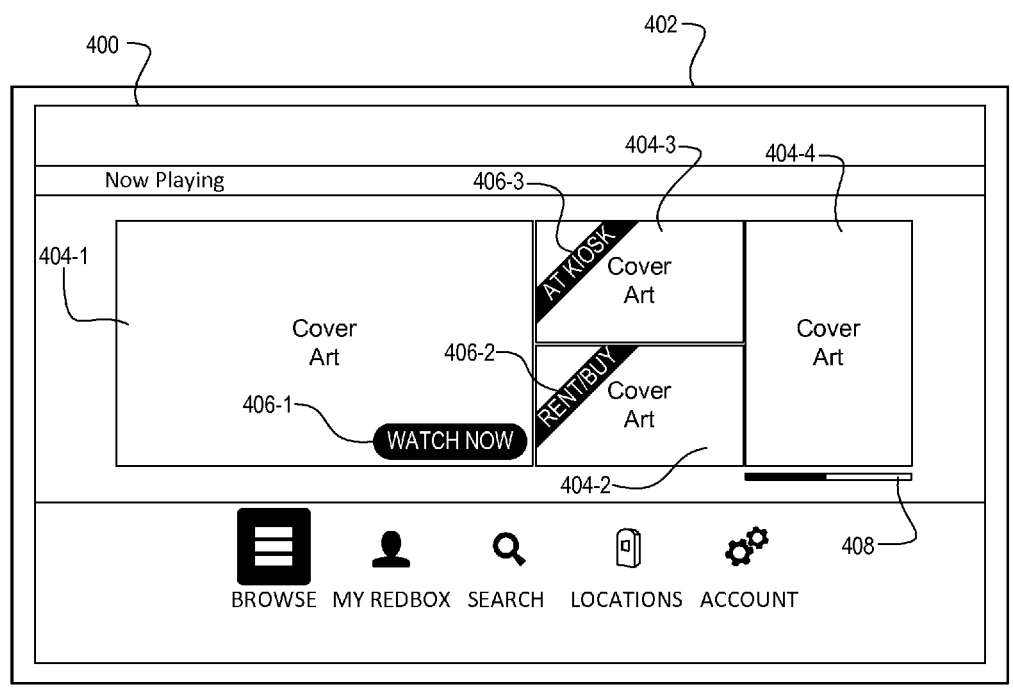
FIGS. 4-11 illustrate exemplary user interface views according to principles described herein.

To illustrate, FIG. 4 depicts a browse view 400 of a GUI that may be provided by the user interface facility 106. The browse view 400 may be provided for display on a display screen 402 associated with the user computing system 202. In certain examples, user interface facility 106 may provide the browse view 400 for display in response to a user request to browse media programs, for example, that are in a particular genre, that are in a particular category (e.g., recent additions), or that are accessible through a particular media distribution model (or any combination thereof). For example, user interface facility 106 may detect a user request to browse newly-released media programs, and respond to the request by providing the browse view 400 for display. Alternatively, user interface facility 106 may detect a user request to browse all media programs available through a subscription-based distribution model, and respond to the request by providing information regarding such media programs for display in display screen 402.

The browse view 400 may include information about a plurality of media programs. For instance, the browse view 400 may include a plurality of cover art image objects 404 (e.g., cover art image objects 404-1 through 404-4) that each may represent a different media program. As used herein, the term "cover art image object" may refer to any image or icon that represents a media program. Such an image or icon may include a thumbnail image of a cover of a physical copy of a media program, an image from a particular scene of, for example, a movie, or any other image or icon that may be used to represent the media program. The cover art image objects 404 may be arranged with respect to each other in a grid such as that illustrated in FIG. 4 where, for example, some of the cover art image objects 404 are sized differently than others. Alternatively, the cover art image objects 404 may be provided in a grid such that each of the cover art image objects 404 have substantially the same size within display screen 402 (see, e.g., FIG. 5). In the example shown in FIG. 4, the browse view 400 may include cover art image objects 404 for media programs titled "Thor," "21 Jump Street," "Sherlock Holmes: A Game of Shadows," and "Tim & Eric's Billion Dollar Movie." For example, cover art image object 404-1 may represent a movie titled "Thor," cover art image object 404-2 may represent a movie titled "Sherlock Holmes: A Game of Shadows," cover art image object 404-3 may represent a movie titled "21 Jump Street," and cover art image object 404-4 may represent a movie titled "Tim & Eric's Billion Dollar Movie."

The media programs represented in the browse view 400 may be available by way of multiple different media distribution models through the media service 102 provided by system 100. The multiple different distribution models may include any one (or combination) of the media distribution models described above. For example, the media programs may be available to rent or buy in a standard definition ("SD") format or a high definition ("HD") format by way of the digital channel-based distribution model, and may be available in DVD format or BD format for rental or purchase from the media vending kiosks 216 by way of the physical channel-based distribution model.

The browse view 400 may include content configured to facilitate convenient and/or intuitive user discovery and/or assessment of the different options available for accessing a media program by way of the different distribution models through the media service 102. Additionally or alternatively, the content may be configured to facilitate convenient and/or intuitive user selection of one or more of the options through which to access the media program for consumption. To this end, the user interface facility 106 may determine a media distribution model by way of which the media program is accessible through the media service 102. Based on the determination, the user interface facility 106 may provide, for display in the media program browse view together with a cover art image object 404, an accessibility indicator that indicates the particular media distribution model by way of which the media program is accessible. As used herein, the term "accessibility indicator" may refer to any icon, graphical object, textual notification, or other indicator that may be provided (e.g., displayed) together with the cover art image object 404 and that is associated with a media distribution model by way of which the media program is accessible through media service 102.

To illustrate, the browse view 400 shown in FIG. 4 includes a plurality of accessibility indicators 406 (e.g., accessibility indicators 406-1 through 406-3) that are provided together with the cover art image objects 404-1 through 404-3. In the example illustrated in FIG. 4, the user 204 may, in a single browse view, be informed by way of the accessibility indicators 406 of a plurality of different media distribution models through which the media programs may be accessible. This may be accomplished by user interface facility 106 determining which media distribution models are associated with the media programs and providing, for display in the display screen 402, accessibility indicators 406 based on the determination. For example, user interface facility 106 may determine that the media program represented by the cover art image object 404-1 is accessible, for example, through a subscription-based and digital channel-based distribution model. Accordingly, the accessibility indicator 406-1, which indicates a "Watch Now" option for accessing the movie "Thor," may be provided together with the cover art image object 404-1. The accessibility indicator 406-1 informs the user 204 that the movie "Thor" is accessible via streaming, downloading, or any other suitable manner through, for example, the subscription-based and digital channel-based distribution model based on a subscription of the user with media service 102. In some implementations, the user 204 may select the "Watch Now" option by providing input to select the accessibility indicator 406-1 and/or the cover art image object 404-1 to initiate instant access and playback of the media program through the subscription-based and digital channel-based distribution model.

Additionally or alternatively, user interface facility 106 may determine that the media program represented by the cover art image object 404-2 is accessible, for example, through a transactional-based and digital channel-based distribution model. Accordingly, the accessibility indicator 406-2, which indicates a "Rent/Buy" option for accessing the movie "Sherlock Holmes: A Game of Shadows," may be provided together with the cover art image object 404-2. Through the accessibility indicator 406-2, the user 204 is informed that the movie "Sherlock Holmes: A Game of Shadows" is available, for example, to rent through the transactional-based and digital channel-based distribution model, or may be purchased through the transactional-based and digital channel-based distribution model. In response to a user selection of the "Rent/Buy" option (e.g., through user input selecting the accessibility indicator 406-2 and/or the cover art image object 404-2), the user 204 may be informed in any suitable manner of further options regarding how to rent and/or purchase the media program by way of a media distribution model associated with the selected option.

Additionally or alternatively, user interface facility 106 may determine that the media program represented by the cover art image object 404-3 is accessible, for example, through either a subscription-based and physical channel-based distribution model or a transactional-based and physical channel-based distribution model. Accordingly, the accessibility indicator 406-3, which indicates an "At Kiosk" option for accessing the movie "21 Jump Street," may be provided together with the cover art image object 404-3. The "At Kiosk" option informs the user 204 that, for example, a physical copy of the movie "21 Jump Street" may be available at one or more media vending kiosks 216 through either the subscription-based and physical channel-based distribution model or the transactional-based and physical channel-based distribution model. In response to a user selection of the "At Kiosk" option (e.g., through user input selecting the accessibility indicator 406-3 and/or the cover art image object 404-3), the user 204 may be presented in any suitable manner with information regarding one or more geographically-convenient media vending kiosks 216 where a physical copy (e.g., a DVD, BD, etc.) of the media program is currently available for vending or reservation. The user 204 may then be able to select a particular media vending kiosk 216 and reserve a physical copy of the media program to be retrieved by the user 204 at a later time.

The exemplary accessibility indicators 406 illustrated in FIG. 4 may each be associated with different media distribution models. However, in some implementations, the accessibility indicators presented in a browse view may all be associated with a single media distribution model. For example, the user 204 may select an option to browse specifically for the media programs available through a subscription-based and digital channel-based distribution model. Accordingly, in such an implementation, all of the availability indicators 406 presented with the cover art image objects 404 in a subscription-based browse view may be associated with the subscription-based and digital channel-based distribution model. Alternatively, the user 204 may select an option to browse specifically for media programs available through one or more media vending kiosks 216. Accordingly, in such an implementation, all of the availability indicators 406 presented with the cover art image objects 404 in a kiosk-based browse view may be associated with a physical channel-based distribution model.

The accessibility indicators 406-1 through 406-3 may each be a graphical object such as a button-like icon, a ribbon, a tag, or any other suitable graphical object. In the example illustrated in FIG. 4, the accessibility indicator 406-1 is provided with a graphical object in the form of a button-like icon overlaid over a bottom right corner of the cover art image object 404-1. The accessibility indicators 406-2 and 406-3, on the other hand, are provided with graphical objects in the form of diagonally-oriented ribbons that are overlaid over upper left corners of the cover art image objects 404-2 and 404-3, respectively. However, the specific shapes, sizes, and content of the graphical objects are not limited to those illustrated in FIG. 4, and may include other shapes, sizes, and content as may suit a particular implementation. In addition, the examples shown in FIG. 4 are illustrative only, and the relative positioning of the accessibility indicators 406 with respect to the cover art image objects 404 may be in any suitable manner as may suit a particular implementation.

In some implementations, user interface facility 106 may provide, for display, a progress bar for a media program in the browse view together with a cover art image object and an accessibility indicator associated with the media program. The progress bar may indicate a progress status of a consumption of the media program by the user 204. For example, the progress bar may illustrate an amount of the media program previously viewed by the user 204 and/or an amount of the media program remaining for viewing by the user 204. To illustrate, FIG. 4 includes a progress bar 408 that is provided together with the cover art image object 404-4 representing the movie "Tim & Eric's Billion Dollar Movie." The tonal contrast illustrated on the progress bar 408 may indicate that the user 204 has previously viewed part of the media program. The progress bar 408 illustrated in FIG. 4 is provided along a bottom edge of the cover art image object 404-4. However, the example shown in FIG. 4 is illustrative only, and the relative positioning of a progress bar 408 with respect to a cover art image object 404 may be in any suitable manner as may suit a particular implementation.

In certain examples, an accessibility indicator 406 may be selected, by user interface facility 106 for inclusion in the browse view together with a cover art image object 404, based on one or more of media program access factors. Examples of such media program access factors and how the factors may be used by user interface facility 106 as the bases for selection of such user interface content for inclusion in a browse view are described below. The exemplary media program access factors described below are illustrative only. Additional and/or alternative media program access factors (and combinations thereof) may be used in other examples as bases for selection, by user interface facility 106, of content to be included in a browse view. Media program access factors may include one or more of a user account subscription status, a media program content status, user device capabilities, and available formats of the media program. Any combination or sub-combination of the media program access factors described herein may be the basis for selecting the user interface content provided for display in a browse view.

In certain examples, user interface facility 106 may select at least some of the user interface content based on a user account subscription status. The user account subscription status may include any information associated with a subscription status of the user 204 as may suit a particular implementation. In one example, the user interface facility 106 may determine that the user 204 is a subscriber to media service 102 and that the media program is accessible through a subscription-based distribution model that utilizes the digital media distribution channel 212. In such an example, the user interface facility 106 may select to provide the "Watch Now" option as the accessibility indicator 406 together with the cover art image object 404 (see, for example, the accessibility indicator 406-1 that is provided together with the cover art image object 404-1 in FIG. 4).

In certain examples, the user interface facility 106 may select at least some of the user interface content based on a media program content status. The media program content status may include any information that may indicate how the media program may be accessible to the user 204. In one example, the media program content status may indicate that the media program is accessible through a physical distribution model that utilizes the physical media distribution channel 220 (e.g., the media program is accessible by way of one or more media vending kiosks 216). Based on such a media program content status, the user interface facility 106 may select "At Kiosk" as the accessibility indicator 406 (see, for example, the accessibility indicator 406-3 that is provided together with the cover art image object 404-3 in FIG. 4).

In certain examples, the user interface facility 106 may select at least some of the user interface content based on one or more user device capabilities. The user device capabilities may include any capabilities of a device or combinations of devices (e.g., a television, a computer, a mobile communications device, a DVD player, a BD player, etc.) through which the user 204 may access the media program. The user device capabilities may also include information regarding the type of the device (e.g., whether the device is a mobile device) and/or an operating system of the user device. To illustrate, the user interface facility 106 may detect, for example, that a user device is a mobile device and that the media program is purchased and downloaded to the mobile device. Accordingly, the user interface facility 106, based on such a detection, may provide "Watch Now" as accessibility indicator 406. In another example, the user interface facility 106 may determine that a user playback device does not have BD format capabilities. Accordingly, the user interface facility 106 may omit BD rental/purchase options from being included as part of the accessibility indicator 406. In another example, the user interface facility 106 may detect that a user device has only SD media format processing capabilities. Accordingly, in such a situation, the accessibility indicator 406 may read "Watch Now" instead of "Watch Now in HD." It is understood that any other suitable device capabilities or combinations of device capabilities may be taken into consideration, by the user interface facility 106, in other examples when determining the user interface content to include in a browse view.

In certain examples, the user interface facility 106 may select at least some of the user interface content based on an available format of the media program. To illustrate, in some examples, the available format of the media program may include any format of a copy of the media program (e.g., DVD format, BD format, etc.) that may be available to rent and/or purchase from one or more media vending kiosks 216. For example, the user interface facility 106 may determine that there are no BD or DVD copies of the media program currently available from a number of media vending kiosks 216 within a certain geographical area (e.g., within 10 miles of the user 204) specified by the user 204. Accordingly, the user interface facility 106 may select to omit an "At Kiosk" accessibility indicator from being provided with the cover art image object 404 in such a situation.

The examples explained above are for illustrative purposes only and are not exhaustive of how the media program access factors may be utilized by the user interface facility 106 to select the user interface content to be provided in a browse view. Additional or alternative media program access factors, or any suitable combination or sub-combination of media program access factors, may be used by the user interface facility 106 to select user interface content to be provided in a browse view.

Additionally or alternatively, the user interface facility 106 may provide, for display, one or more status indicators together with the cover art image object. As used herein, the term "status indicator" may refer to any notification, textual or otherwise, that may be provided to the user 204 regarding a status of a media program represented by the cover art image object. The status indicators may be associated with a plurality of media distribution models as well as one or more of a rental status of the media program, a subscription status of the media program, a physical location of a physical copy of the media program, and a time limit associated with accessing the media program. Specific examples of status indicators, and how they may be associated with cover art image objects in a browse view, are provided in detail below.

Figure 5:
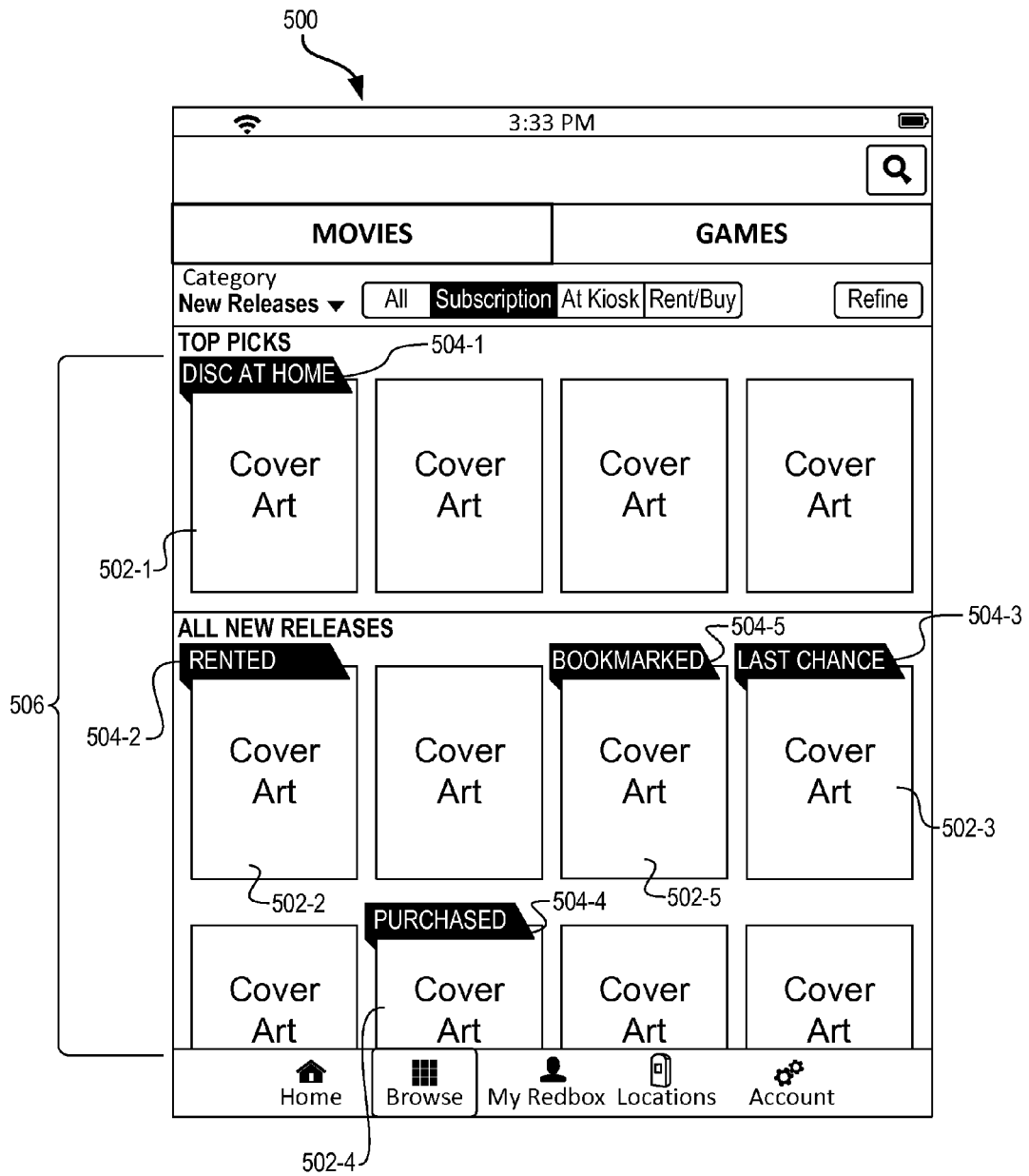

To illustrate, FIG. 5 shows an exemplary browse view 500, which may include a plurality of cover art image objects 502 (e.g., cover art image objects 502-1 through 502-5). As illustrated in FIG. 5, the browse view 500 may include a grid of uniformly-sized cover art image objects 502 representing media programs. The user 204 may provide input to navigate the grid of cover art image objects 502, such as by scrolling the grid in one or more directions (e.g., one or more directions parallel to one or more dimensions of the grid) within the media program browse view to move image objects out of the media program browse panel (e.g., off-screen) and/or into the media program browse view (e.g., on-screen) to find media programs that may be of interest to the user.

At least some of the cover art image objects 502 may be provided with status indicators 504 (e.g., status indicator 504-1 through 504-5) that indicate statuses of the media programs represented by the cover art image objects 502. For example, in FIG. 5, cover art image object 502-1 is presented together with a status indicator 504-1, which provides a "Disc at Home" indication to the user 204. The "Disc at Home" status indicator 504-1 may be selected by user interface facility 106 based on a physical location of the media program. That is, user interface facility 106 may determine in any suitable manner that the user 204 rented a physical copy (e.g., a DVD or BD) of the media program from the media vending kiosk 216, and that the user 204 currently is in possession of the physical copy (e.g., the physical copy of the media program has not yet been returned to a media vending kiosk 216). Accordingly, user interface facility 106 may select "Disc at Home" as the status indicator 504-1 to be provided in the browse view 500 together with the cover art image object 502-1.

In another example illustrated in FIG. 5, user interface facility 106 may determine that the user 204 rented the media program represented by the cover art image object 502-2 through, for example, a transactional-based and digital channel-based distribution model. Accordingly, user interface facility 106 may select "Rented" as the status indicator 504-2 to be provided in the browse view 500 together with the cover art image object 502-2. The "Rented" status indicator 504-2 may be provided together with the cover art image object 502-2 based on a time limit associated with accessing the media program represented by the cover art image object 502-2. For example, the user 204 may, through the transactional-based and digital channel-based distribution model provided by media service 102, rent the media program for two days. During the two day rental period, user interface facility 106 may select the "Rented" status indicator 504-2 to be provided together with the cover art image object 502-2 in the browse view 500.

Alternatively, user interface facility 106 may determine that a particular media program is only available for a limited time. For example, the media program may only be available for a limited time through one of a transactional-based and digital channel-based distribution model, a subscription-based and digital channel-based distribution model, and/or a transaction-based and physical channel-based distribution model based on, for example, a licensing agreement associated with the media program. Accordingly, user interface facility 106 may select the status indicator 504 based on the limited availability of the media program. To illustrate, FIG. 5 shows a "Last Chance" status indicator 504-3 being associated with the media program represented by the cover art image object 502-3. The "Last Chance" status indicator 504-3 notifies the user 204 that the media program may not be available much longer through, for example, the current subscription of the user 204.

In some examples, user interface facility 106 may determine that there are a plurality of status indicators 504 associated with a media program, and may select a status indicator 504, from the plurality of status indicator 504, based on the one or more media program access factors described herein. For example, user interface facility 106 may determine that the user 204 purchased a digital copy of the media program represented by the cover art image object 502-4 illustrated in FIG. 5 by way of, for example, a transactional-based and digital channel-based distribution model. Thus, user interface facility 106 may determine that a "Purchased" status indicator applies to the media program represented by the cover art image object 502-4. The user interface facility 106 may also determine that the "Last Chance" status indicator applies to the media program represented by the cover art image object 502-4 based on, for example, an upcoming expiration of a licensing agreement associated with the media program. Because the user 204 already purchased the digital copy of the media program, the user interface facility 106 may select "Purchased" as the status indicator 504-4 to be provided together with the cover art image object 502-4 in the browse view 500 instead of the "Last Chance" status indicator.

In certain examples, user interface facility 106 may be configured to provide, for display together with a cover art image object, an indication that the media program represented by the cover art image object has been bookmarked by user 204. To illustrate, FIG. 5 shows a status indicator 504-5, which indicates a bookmarked status of the media program represented by the cover art image object 502-5. When user 204 provides input in any suitable manner to bookmark a media program, the media program may be marked as having a bookmarked status relative to user 204. This may be accomplished in any suitable way, such as by updating a user account associated with user 204 with data indicating the bookmarked status of the media program. When the media program has bookmarked status for user 204, the status indicator 504-5 may follow and be displayed together with the cover art image object 502-5 representative of the media program no matter in which view of a media service user interface the cover art image object 502-5 may be presented (e.g., any of the browse views as well as any other view) or by which distribution model the media program is accessible. Accordingly, the status indicator 504-5 may be presented in any context (e.g., distribution model context and/or user interface context) in which the bookmarked media program is represented. If the media program moves from one distribution model to another distribution model, such as described herein, the bookmarked status may follow the media program.

Each of the exemplary status indicators 504 illustrated in FIG. 5 may be associated with a graphical object representing the status indicator 504. In the examples illustrated in FIG. 5, the graphical objects include ribbons that are partially overlaid over an upper left portion of the cover art image objects 502. The shape, size, and/or content of the graphical objects associated with the status indicators 504 are not limited to that illustrated in FIG. 5, and may include any shape, size, and/or content as may suit a particular implementation. In addition, the position of the graphical objects associated with the status indicators 504 relative to the cover art image objects 502 in FIG. 5 is provided by way of example only. The graphical objects associated with the status indicators 504 may be provided in any suitable manner with respect to the cover art image objects 502 as may suit a particular implementation. In addition, the exemplary status indicators described above are illustrative only. Additional and/or alternative status indicators may be used in other examples as may suit a particular implementation.

In some implementations, user interface facility 106 may provide, for display, a progress bar for a media program in the browse view together with the cover art image objects 502 and the status indicators 504. The progress bar may indicate a progress status of a consumption of the media program by the user 204 and may be presented in the browse view in a manner similar to that described with respect to FIG. 4.

The exemplary accessibility indicators and status indicators described above are described as being provided within a browse view. In certain examples, user interface facility 106 may provide accessibility indicators and/or status indicators for display in various different types of browse views, as well as in any other type of view of a media service user interface. Examples of accessibility indicators and status indicators and how they may be provided by user interface facility 106 for display together with cover art image objects in different browse views, as well as in other views of a media service user interface are described with reference to Tables 1-8, shown below.

TABLE 1

| Category | Location | Accessibility/Status Indicator Name | Description |
|---|---|---|---|
| User Action | Top | Purchased | User may have purchased media program |
| User Action | Bottom | Progress Bar | Progress of consumption of a specific media program |
| User Action | Bottom | Star Rating | User and/or fan generated star rating of a media program |
| Content Status | N/A | Tomatometer | Shows Tomatometer % and/or icon for media program |
| Content Status | N/A | Media Program Provider | Media program may be provided by a specific media content provider - may show logo |
| User Action | Top | Expires in <days>, <hours> | User hay have rented media program - shows when rental period expires |
| User Action | Top | Awaiting Pickup | Disc may be rented and awaiting pickup (e.g., reserved for pickup) |
| User Action | Top | Disc At Home | Disc may be rented and picked up |
| User Action | Top | Last Chance | Media program is leaving a media distribution model catalogue, for example, in 5 days or less (user may have bookmarked this media program) |
| User Action | Top | Now Available | Media program has entered media distribution model catalogue, for example, in the last 5 days (user may have bookmarked this media program) |
| Content Status | Top | Special Pricing | Indicates that a special price may be available for this media program |
| Content Status | Top | Digital Exclusive | Media program may be available for digital purchase before becoming available by way of other distribution models. May have a start and end date |
| User Action | Top | Bookmarked | User has bookmarked the media program |
| Content Status | Top | Coming Soon | Media program may be coming soon (any media distribution model catalogue) |
| Content Status | Top | 10-Minute Preview | Free 10 minute preview may be available |
| Content Status | Top | Most Popular | Media program may be one of, for example, 20 most popular media programs |
| Content Status | Top | Back Again | Media program has re-entered a media distribution model catalogue |
| Content Status | Bottom | Not Eligible | Media program may not be in user's subscription |
| Content Status | Bottom | Primary Subscription Tier | Media program may be in the primary subscription |
| Content Status | Bottom | Media Program Provider Subscription Tier | Media program may be in a specific media content provider's subscription tier |
| Content Status | Bottom | Kids Subscription Tier | Media program may be in a kids subscription catalogue |
| Content Status | Bottom | At the Box | Media program may be available in a physical kiosk distribution model catalogue |
| Content Status | Bottom | Rent/Buy | Media program may be available in a Rent/Buy distribution model catalogue |
| Content Status | Bottom | Streamable | Media program may be available to stream (in any way) |
| Content Status | Bottom | Pricing | Shows lowest price of accessing the media program (e.g., 'From $3.00') |
| Content Status | Bottom | BLU-RAY | Media program may be available in BD format |

Table 1 provides information associated with exemplary accessibility indicators and/or status indicators and how they may be provided for display together with a cover art image object. As shown in Table 1, such information includes a name of the accessibility indicators and/or status indicators, a category of the accessibility indicators and/or status indicators, an exemplary display location of the accessibility indicators and/or status indicators with respect to a cover art image object, and a brief description of the accessibility indicators and/or status indicators.

The category of the accessibility indicators and/or status indicators may include a "user action" category and a "content status" category. The "user action" category may indicate that the accessibility indicator and/or status indicator is associated with the cover art image object as a result of some action taken by user 204. For example, the "Awaiting Pickup" status indicator may be selected by user interface facility 106 based on user 204 having reserved a physical copy of the media program for pickup at, for example, a media vending kiosk 216. The "content status" category may indicate that the accessibility indicator and/or status indicator is provided together with the cover art image object based on a status of the media program. For example, the user interface facility 106 may select the "Back Again" status indicator to be provided for display together with the cover art image object if the media program has recently rejoined a catalogue of media programs accessible, for example, by way of a subscription of user 204. The examples of accessibility indicators and/or status indicators, and associated information, depicted in Table 1 are illustrative only. Other accessibility indicators and/or status indicators may be defined in other implementations.

In certain examples, two or more of the exemplary accessibility indicators and/or status indicators shown in Table 1 may be applicable to a particular media program. In such a circumstance, user interface facility 106 may be configured to determine which accessibility indicator and/or status indicator to provide for display together with the cover art image object representing the media program based on predefined priority selection criteria. The predefined priority selection criteria may attribute a priority value to at least some of the accessibility indicators and/or the status indicators as shown, for example, in Tables 2-8 below. Based on the priority values, user interface facility 106 may select one or more of the accessibility indicators and/or status indicators to provide for display together with the cover art image object. Specific examples of how user interface facility 106 may use the priority values to select one or more accessibility indicators and/or status indicators to provide for display together with a cover art image object in different views are described herein.

In certain examples, the predefined priority selection criteria may include a global prioritization in which the priority values may define how the accessibility indicators and/or the status indicators are provided for display by user interface facility 106 across all views, which may include all browse views as well as any other view of a media service user interface. Additionally or alternatively, the predefined priority selection criteria may include a view-specific prioritization in which the priority values may define how the accessibility indicators and/or the status indicators are prioritized for presentation within a single view. Specific examples of how user interface facility 106 may utilize a global prioritization and/or a view-specific prioritization with respect to certain accessibility indicators and/or status indicators are described herein.

As mentioned, in some examples, user interface facility 106 may be configured to provide, for display, any of the accessibility indicators and/or the status indicators described herein in any type of browse view of a media service user interface. For example, a browse view may correspond to a "main" browse view, an "at kiosk" browse view, a "rent/buy" browse view, a "subscription" browse view (subscriber), a "subscription" browse view (unsubscribed), and a "homepage" browse view, which are each described with reference to Tables 2-4, shown below.

TABLE 2

| Accessibility/Status Indicator Name | "Main" Browse View Type | Priority | "At Kiosk" Browse View Type | Priority | "Rent/Buy" Browse View Type | Priority |
|---|---|---|---|---|---|---|
| Purchased | RIBBON | 1 | RIBBON | 1 | RIBBON | 1 |
| Progress Bar | BAR | 1 | BAR | 1 | BAR | 1 |
| Star Rating | STARS | 1 | STARS | 1 | STARS | 1 |
| Tomatometer | — | — | — | — | — | — |
| Media Program Provider | — | — | — | — | — | — |
| Expires in <days>, <hours> | RIBBON | 2 | RIBBON | 2 | RIBBON | 2 |
| Awaiting Pickup | RIBBON | 3 | RIBBON | 3 | RIBBON | 3 |
| Disc At Home | RIBBON | 4 | RIBBON | 4 | RIBBON | 4 |
| Last Chance | RIBBON | 5 | RIBBON | 5 | RIBBON | 5 |
| Now Available | RIBBON | 6 | RIBBON | 6 | RIBBON | 6 |
| Special Pricing | RIBBON | 7 | RIBBON | 7 | RIBBON | 7 |
| Digital Exclusive | RIBBON | 8 | — | — | RIBBON | 8 |
| Bookmarked | RIBBON | 9 | RIBBON | 9 | RIBBON | 9 |
| Coming Soon | — | — | — | — | — | — |
| 10-Minute Preview | RIBBON | 10 | RIBBON | 10 | RIBBON | 10 |
| Most Popular | — | — | RIBBON | 11 | — | — |
| Back Again | — | — | RIBBON | 12 | — | — |
| Not Eligible | ICON | Yes | — | — | — | — |
| Primary Subscription Tier | ICON | Yes | — | — | — | — |
| Media Program Provider Subscription Tier | ICON | Yes | — | — | — | — |
| Kids Subscription Tier | ICON | Yes | — | — | — | — |
| At the Box | ICON | Yes | — | — | — | — |
| Rent/Buy | ICON | Yes | — | — | — | — |
| Streamable | ICON | Yes | — | — | — | — |
| Pricing | — | — | — | — | ICON | Yes |
| BLU-RAY | — | — | ICON | Yes | — | — |

Table 2 includes information regarding how the exemplary accessibility indicators and/or the status indicators listed in Table 1 may be provided together with a cover art image object in the "main" browse view, the "at kiosk" browse view, and the "rent/buy" browse view of a media service user interface. The "main" browse view may show all of the media programs available through media service 102 by way of any of the distribution models described herein (e.g., the "main" browse view may show cover art image objects representing media programs that would be provided for display by user interface facility 106 in each of the "at kiosk" browse view, the "rent/buy" browse view, the subscription browse view (subscriber), and the subscription browse view (unsubscribed)). The "at kiosk" browse view may show all of the media programs available to user 204 through media service 102 by way of a kiosk-based distribution model. For example, user interface facility 106 may provide, for display in the "at kiosk" browse view, a plurality of cover art image objects representing media programs that are available to rent and/or purchase by way of a kiosk distribution model (e.g., from a plurality of media vending kiosks within a certain geographic area associated with user 204). The "rent/buy" browse view may show cover art image objects representing media programs available to rent and/or to buy through media service 102 by way of, for example, a digital media distribution model. Specific examples of how user interface facility 106 may provide accessibility indicators and/or status indicators for display in each of these views are provided herein.

As shown in Table 2, a "type" may be defined for at least some of the accessibility indicators and/or status indicators. The "type" of the accessibility indicators and/or status indicators may refer to how the accessibility indicators and/or status indicators are provided together with a cover art image object representing a media program. For example, as shown in Tables 2-4, the "type" of the accessibility indicator and/or status indicator may include a ribbon, a bar, stars, an icon, and/or a logo (see, e.g., Table 4). Examples of the various "types" of accessibility indicators and/or status indicators will now be described.

The ribbon "type" of accessibility indicator and/or status indicator may be provided across a top (see, e.g., status indicator 504-3 illustrated in FIG. 5) and/or a bottom of a cover art image object. Alternatively, the ribbon may be provided at an angle with respect to a cover art image object (see, e.g., accessibility indicator 406-3 illustrated in FIG. 4). In certain examples, user interface facility 106 may provide, for display, a ribbon along a top portion of a cover art image object and may provide, for display, a different ribbon along a bottom portion of the cover art image object. In other examples, only one ribbon may be provided together with a cover art image object at a given time.

The bar "type" of accessibility indicator may correspond to a progress bar such as, for example, progress bar 408 illustrated in FIG. 4. The progress bar may follow a cover art image object representing a media program no matter in which view the cover art image object may be presented (e.g., any of the browse views as well as any other view described herein).

The stars "type" of status indicator may correspond to a grouping of, for example, star icons that indicate a user and/or fan rating associated with a media program. For example, if a particular media program has a three and a half star rating, three and a half of five stars icons may be filled in (e.g., with a particular display color, shade, etc.) while the remaining one and a half stars may remain empty (see, e.g., FIG. 10). In certain examples, a color of the stars may be different depending on the type of star rating provided for display by user interface facility 106. For example, if the star rating is based on ratings provided by a first group of users, the color of the stars may be, for example, red. Alternatively, if the star rating is based on ratings provided by a second group of users, the color of the stars may be, for example, yellow. In some examples, the first group of users may include the user accessing the view, and the second group of users may not include the user accessing the view.

Figure 6:
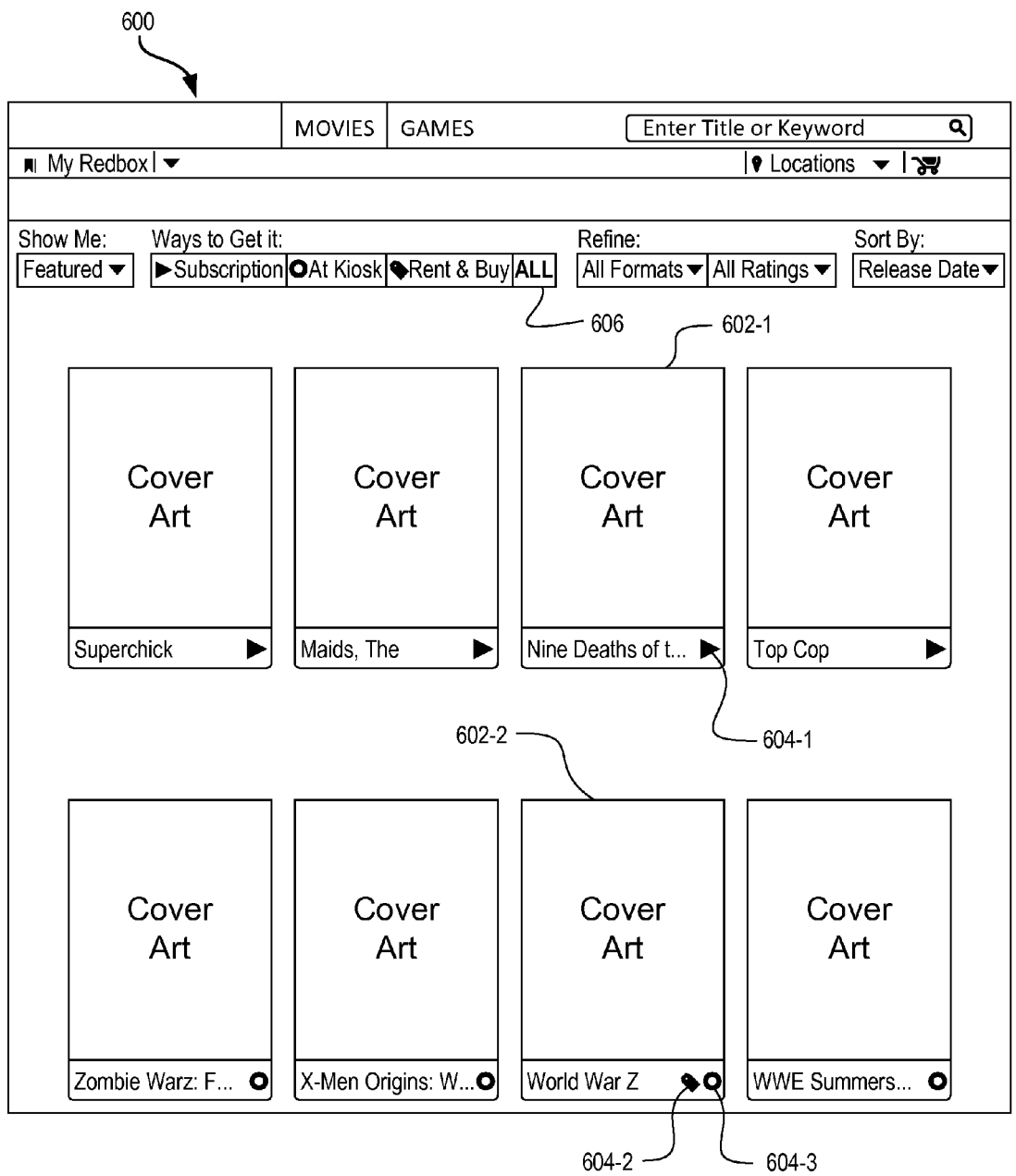

The icon "type" of accessibility indicator and/or status indicator may correspond to any graphical object that may be associated with a cover art image object representing a media program. To illustrate, FIG. 6 shows an exemplary "main" browse view 600, which may include a plurality of cover art image objects 602 (e.g., cover art image objects 602-1 and 602-2) arranged in a grid. As shown in FIG. 6, different accessibility indicators 604 (e.g. accessibility indicators 604-1 through 604-3) may be provided for display together with cover art image objects 602-1 and 602-2. User 204 may access the "main" browse view through, for example, a user selection of a user-selectable graphical object 606 illustrated in FIG. 6. In the "main" browse view 600, a plurality of different accessibility indicators may be provided as icons together with a cover art image object representing a media program. In some examples, the icons may include a triangle icon (e.g., a play icon), a ticket icon, and/or a disc icon, which may indicate different distribution models through which the media program may be accessible. For example, the triangle icon may represent a subscription-based distribution model, the disc icon may represent a kiosk-based distribution model, and the ticket icon may represent a transactional-based and digital channel-based distribution model (e.g., a "rent/buy" digital distribution model). Other icons may be associated with cover art image objects as may suit particular implementations.

In some examples, the icons may be provided at a position that is adjacent to a bottom portion of a cover art image object. To illustrate, FIG. 6 shows an accessibility indicator 604-1 in the form of a triangle icon that is provided together with cover art image object 602-1. The accessibility indicator 604-1 indicates that the media program represented by the cover art image object 602-1 may be accessible, for example, by way of a current subscription of the user through the subscription-based distribution model. In the example illustrated in FIG. 6, the accessibility indicator 604-1 is provided in a section adjacent to the bottom portion of the cover art image object 602-1 together with text identifying the media program (e.g., a title of the media program). However, the accessibility indicator may be provided together with cover art image object 602-1 in any manner as may suit a particular implementation.

In certain examples, one or more icons may be provided together with a single cover art image object. To illustrate, FIG. 6 shows an example in which multiple accessibility indicators 604 (e.g., 604-2 and 604-3) may be provided together with a single cover art image object 602-2. The accessibility indicator 604-2 corresponds to a ticket icon, which indicates that the media program represented by the cover art image object 602-2 may be available to rent and/or purchase through, for example, a transactional-based and digital channel-based distribution model. The accessibility indicator 604-3 corresponds to a disc icon, which indicates that the media program represented by the cover art image object 602-2 may be available to rent and/or purchase through, for example, a physical channel-based distribution model (e.g., from one of the media vending kiosks 216).

In certain examples, the icons (e.g., the triangle icon, the ticket icon, and the disc icon) may each be provided together with each cover art image object regardless of whether the media programs represented by the cover art image objects are accessible through the distribution models represented by the icons. In such an example, user interface facility 106 may determine which icons are applicable to a particular media program and provide, for display, greyed out versions of the icons that are not applicable. For example, user interface facility 106 may determine that a particular media program is accessible through a kiosk-based distribution model, and a transactional-based and digital channel-based distribution model, but not a subscription-based distribution model. Accordingly, user interface facility 106 may provide, for display, the ticket icon, the disc icon, and a greyed out version of the triangle icon together with the cover art image object representing the media program.

The logo "type" of accessibility indicator and/or status indicator may correspond to a graphical object representing a specific media program provider that may be associated with a cover art image object representing a media program. For example, user interface facility 106 may determine that a particular media program is provided by a specific media content provider such as HBO or Starz. In such an example, user interface facility 106 may provide, for display, any suitable logo representing HBO or Starz together with the cover art image object representing the media program.

The exemplary "types" of accessibility indicators and/or status indicators discussed above are illustrative only. Different "types" may be defined in different examples as may suit a particular implementation. In addition, in Tables 2-8, a "- - - - -" provided in the "type" section for a particular accessibility indicator and/or status indicator may indicate that the particular accessibility indicator and/or the status indicator may not be provided for display by user interface facility 106 in a particular view.

In addition to a "type" being defined for some of the accessibility indicators and/or the status indicators listed in Tables 2-8, a "priority" may also be defined for at least some of the accessibility indicators and/or the status indicators. The priority may correspond to a priority value (e.g., a numerical priority value from "1"-"12") that may be assigned to some of the accessibility indicators and/or the status indicators. In the examples shown in Table 2, the accessibility indicators and/or the status indicators with relatively higher priorities (indicated by relatively lower numerical priority values) are prioritized for display by user interface facility 106 over the accessibility indicators and/or the status indicators with relatively lower priorities (indicated by relatively higher numerical priority values). That is, an accessibility indicator or status indicator with a numerical priority value of, for example, "1" may be provided for display by user interface facility 106 instead of an accessibility indicator or status indicator having a numerical priority value with the range of "2"-"12".

In some examples, multiple accessibility indicators and/or status indicators may have a same priority value. For example, the first three exemplary accessibility indicators and/or status indicators (e.g., the "Purchased," the "Progress Bar," and the "Star Rating" indicators) shown in Table 2 each have a priority value of "1." If each of the first three accessibility indicators apply to a particular media program, user interface facility 106 may provide all three of them for display together with the cover art image object representing the media program. For example, user interface facility 106 may provide, for display, a ribbon including the "Purchased" indicator along a top portion of the cover art image object representing the media program, and may provide a "Progress Bar" indicator and a "Star Rating" indicator at a bottom portion of the cover art image object.

In Tables 2-8, a "- - - - -" provided in the "priority" section for a particular accessibility indicator and/or status indicator may indicate that the particular accessibility indicator and/or status indicator may not be provided for display by user interface facility 106 in a particular view.

At least some of the accessibility indicators and/or availability indicators listed in Tables 2-8 list "Yes" in the priority section instead of a number. In certain examples, user interface facility 106 may provide, for display, as many of the accessibility indicators and/or availability indicators with "Yes" for the priority as may be applicable to a particular media program. For example, user interface facility 106 may determine that the "Streamable" accessibility indicator and the "Rent/Buy" accessibility indicator each apply to a particular media program in the "main" browse view. Because both the "Streamable" accessibility indicator and the "Rent/Buy" accessibility indicator are designated with "Yes" as the priority in Table 2, user interface facility 106 may provide each of them in the form of, for example, icons for display together with a cover art image object representing the media program. Such icons may be provided in addition to other accessibility indicators and/or status indicators that may be provided for display by user interface facility 106 based on a specific numerical priority value (e.g., a value from "1"-"12").

As mentioned, the predetermined priority selection criteria may include a global prioritization or a view-based prioritization. For example, user interface facility 106 may determine that a "Purchased" status indicator takes priority over all other indicators and may, as a result, globally prioritize the "Purchased" status indicator. Accordingly, if user 204 has purchased a copy of a particular media program, user interface facility 106 may provide, for example, a ribbon including the text "Purchased" together with a cover art image object representing the media program in each view in which the cover art image object may be provided for display by user interface facility 106 (e.g., in each of the browse views described herein, as well as in any other view of a media service user interface). In another example, user interface facility 106 may globally prioritize the "Progress bar" indicator such that, if user 204 has, for example, consumed at least a part of a media program, the "Progress bar" indicator may be provided for display together with a cover art image object representing the media program in each view that the cover art image object may be provided for display by user interface facility 106 (e.g., in each of the browse views described herein, as well as in any other view of a media service user interface).

Figure 7:
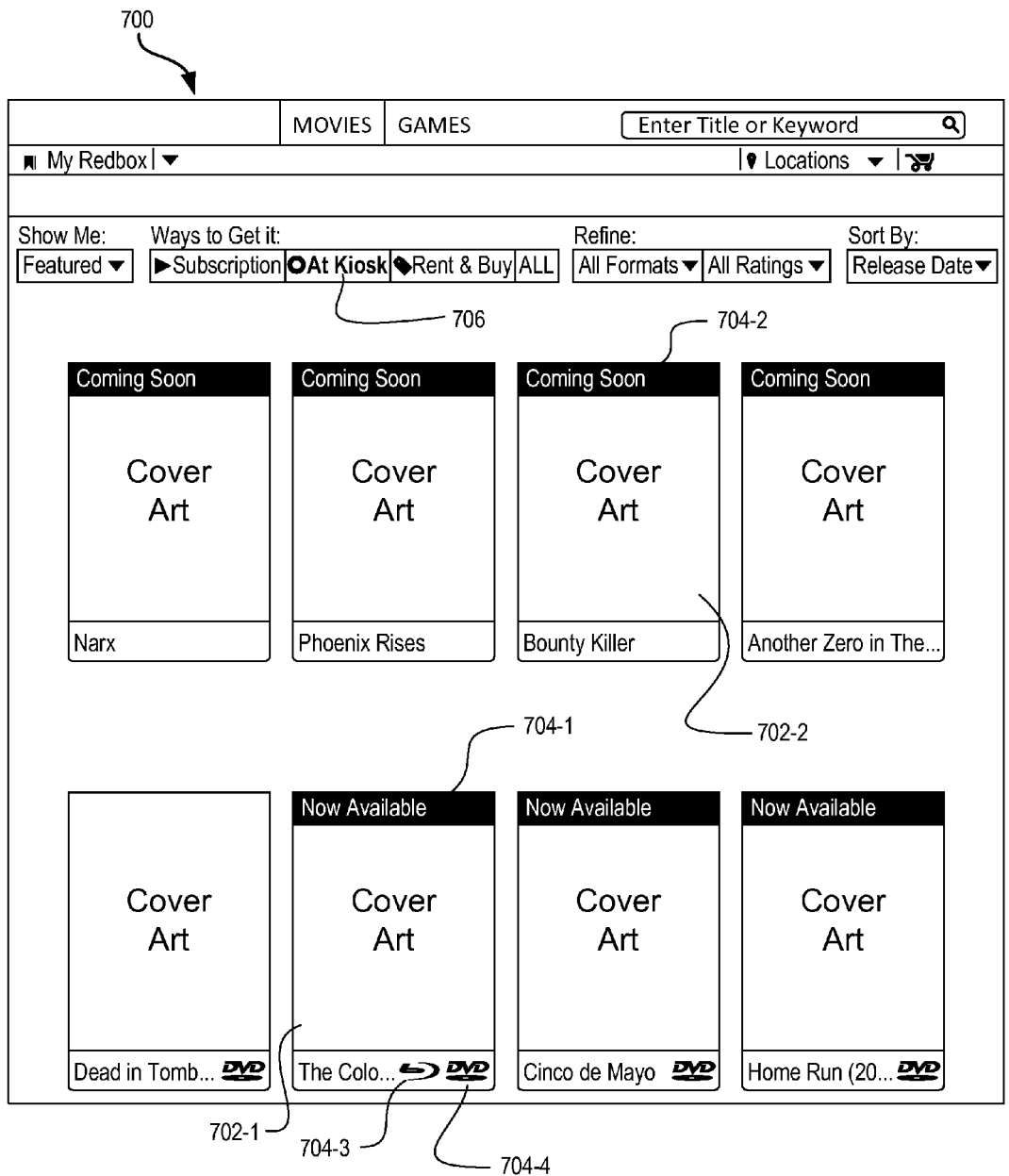

Alternatively, a priority value of an accessibility indicator and/or a status indicator may only affect how the accessibility indicator and/or status indicator is provided for display within a subset of the possible views, such as with the view-based prioritization. With the view-based prioritization, user interface facility 106 may select the accessibility indicators and/or status indicators based on the status indicators being associated with a specific media distribution model (e.g., a kiosk-based media distribution model) and/or based on their respective priority values. To illustrate, FIG. 7 shows an exemplary "at kiosk" browse view 700, which may include a plurality of cover art image objects 702 (e.g., cover art image objects 702-1 and 702-2) arranged in a grid. As shown in FIG. 7, different status indicators 704 (e.g. status indicators 704-1 and 704-2) may be provided for display together with cover art image objects 702-1 and 702-2. User 204 may access the "at kiosk" browse view 700 through, for example, a user selection of a user-selectable graphical object 706 illustrated in FIG. 7. In the "at kiosk" browse view 700, status indicators 704-1 and 704-2 may be provided as ribbons together with a cover art image objects 702-1 and 702-2. User interface facility 106 may determine that both the "Now Available" status indicator and the "Most Popular" status indicator may apply to the media program represented by the cover art image object 702-1 in the "at kiosk" browse view 700. However, because the "Now Available" status indicator has a lower priority value of "6" (see, e.g., Table 2), user interface facility 106 may select the "Now Available" status indicator 704-1 to be provided for display together with cover art image object 702-1 in the "at kiosk" browse view instead of the "Most Popular" status indicator. In another example illustrated in FIG. 7, user interface facility 106 may provide, for display, the "Coming Soon" status indicator 704-2 together with cover art image object 702-2 based on the media program represented by cover art image object 702-2 being available from one of the media vending kiosks 216, for example, within a predetermined amount of time (e.g., within two weeks).

In certain examples, user interface facility 106 may provide, for display, multiple accessibility indicators and status indicators together with a single cover art image object. To illustrate, FIG. 7 shows an example in which, in addition to the status indicator 704-1, accessibility indicators 704-3 and 704-4 are provided together with cover art image object 702-1. Accessibility indicators 704-3 and 704-4 include icons representing different media formats (e.g., DVD and BD formats) that may be available through one of the media vending kiosks 216. As shown in FIG. 7, multiple media formats (e.g., DVD and BD) may be indicated for a particular media program or only one media format may be indicated if the media program is available in only one media format.

The exemplary status indicators shown in FIG. 7 are illustrative only. Other status indicators and/or accessibility indicators may be provided for display by user interface facility 106 as may suit a particular implementation.

Figure 8:
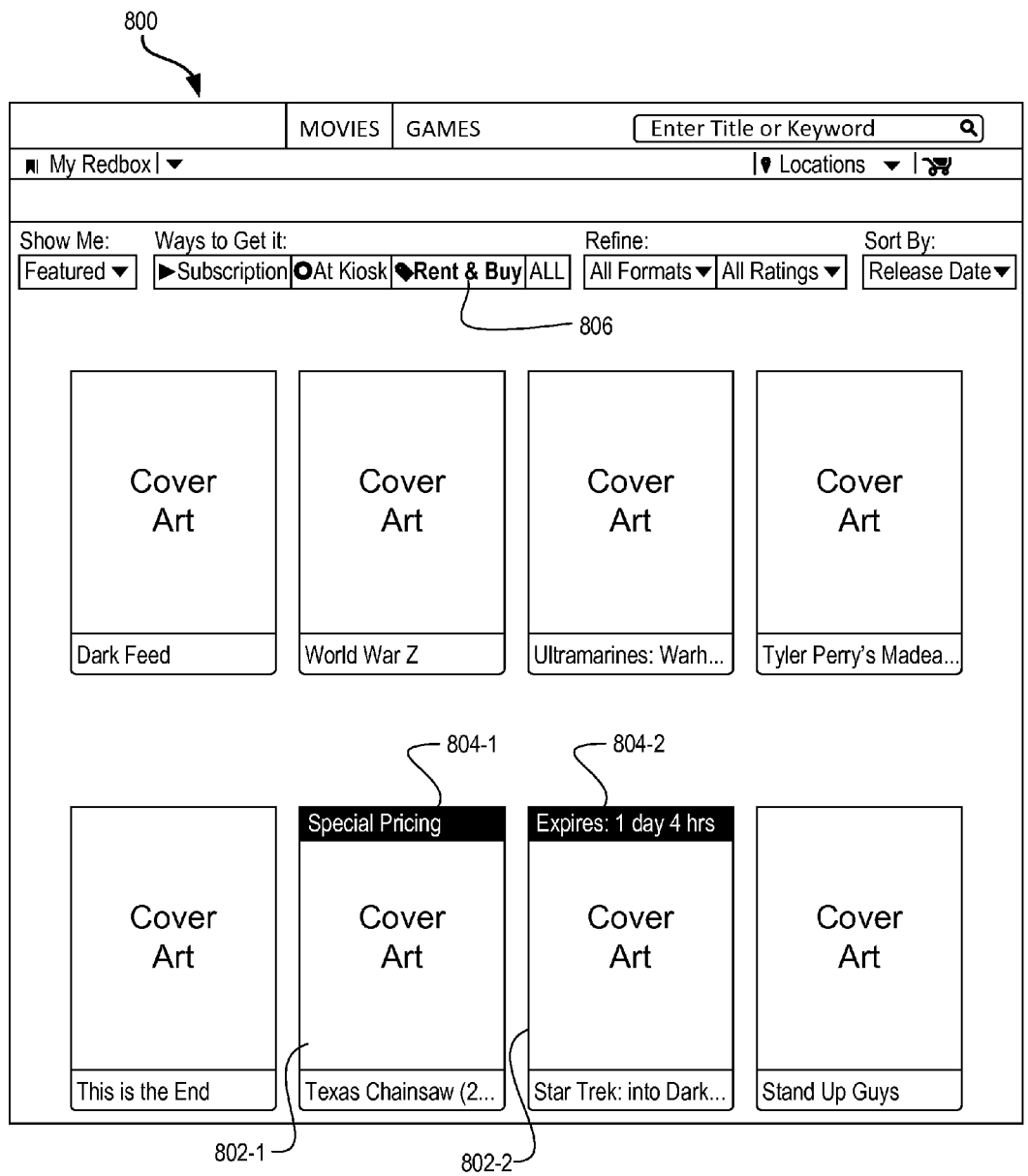

Table 2 also shows exemplary accessibility indicators and/or status indicators that may be provided together with cover art image objects in a "rent/buy" browse view. To illustrate, FIG. 8 shows an exemplary "rent/buy" browse view 800, which may include a plurality of cover art image objects 802 (e.g., cover art image objects 802-1 and 802-2) that are provided together with status indicators 804 (e.g. status indicators 804-1 and 804-2). The user 204 may access the "rent/buy" browse view through, for example, a user selection of a user-selectable graphical object 806 illustrated in FIG. 8. Status indicators 804 may be selected by user interface facility 106 for display based on their respective priority values as described herein.

In certain examples, user interface facility 106 may determine that a discount in price is in effect for a particular media program. In view of this, user interface facility 106 may provide, for display, an accessibility indicator together with a cover art image object representing the media program to reflect the discount in price. To illustrate, user interface facility 106 may select a "Special Pricing" status indicator 804-1 to be provided for display together with the cover art image object 802-1 in FIG. 8 based on a discount associated with renting and/or buying the media program. In certain examples, the user interface facility 106 may determine that a particular media program represented in the "rent/buy" browse view is currently rented by the user 204, and that the rental period will expire in one day and four hours. In such an example, the user interface facility 106 may provide, for display as shown in FIG. 8, the status indicator 804-2, which indicates that the rental period "Expires in 1 day, 4 hours." The "Expires in 1 day, 4 hours" status indicator 804-2 may provide a reminder to user 204 that the rental time period to access the media program will expire soon. The exemplary status indicators shown in FIG. 8 are illustrative only. Other status indicators and/or accessibility indicators may be provided in a "rent/buy" browse view as may suit a particular implementation.

In certain examples, user interface facility 106 may provide, for display, a subscription-based browse view to facilitate user 204 determining options available through, for example, a subscription to media service 102. The accessibility indicators and/or status indicators provided for display in the subscription-based browse view may change depending on a subscription status of user 204 (i.e., whether user 204 is a subscriber or not a subscriber). For example, when user 204 is a subscriber, and is logged into a user account associated with media service 102, user interface facility 106 may provide the "subscription" browse view (subscriber) for display. When user 204 is not a subscriber, or is a subscriber but is logged out of the user account, user interface facility 106 may provide the "subscription" browse view (unsubscribed) for display. Specific examples of how the user interface facility 106 may provide accessibility indicators and/or status indicators for display together with a cover art image object in the "subscription" browse view (subscriber) and the "subscription" browse view (unsubscribed) are described with reference to Table 3, shown below.

TABLE 3

| Accessibility/ Status Indicator Name | "Subscription" Browse View (Subscriber) | | "Subscription" Browse View (Unsubscribed or Logged Out User) | |
|---|---|---|---|---|
| | Type | Priority | Type | Priority |
| Purchased | RIBBON | 1 | RIBBON | 1 |
| Progress Bar | BAR | 1 | BAR | 1 |
| Star Rating | STARS | 1 | STARS | 1 |
| Tomatometer | — | — | — | — |
| Media Program Provider | — | — | — | — |
| Expires in <days>, <hours> | RIBBON | 2 | RIBBON | 2 |
| Awaiting Pickup | RIBBON | 3 | RIBBON | 3 |
| Disc At Home | RIBBON | 4 | RIBBON | 4 |
| Last Chance | RIBBON | 5 | RIBBON | 5 |
| Now Available | RIBBON | 6 | RIBBON | 6 |
| Special Pricing | RIBBON | 7 | RIBBON | 7 |
| Digital Exclusive | RIBBON | 8 | RIBBON | 8 |
| Bookmarked | RIBBON | 9 | RIBBON | 9 |
| Coming Soon | — | — | — | — |
| 10-Minute Preview | RIBBON | 10 | RIBBON | 10 |
| Most Popular | — | — | — | — |
| Back Again | — | — | — | — |
| Not Eligible | ICON | Yes | — | — |
| Primary Subscription Tier | ICON | Yes | ICON | Yes |
| Media Program Provider Subscription Tier | ICON | Yes | ICON | Yes |
| Kids Subscription Tier | ICON | Yes | ICON | Yes |
| At the Box | — | — | — | — |
| Rent/Buy | — | — | — | — |
| Streamable | — | — | — | — |
| Pricing | — | — | — | — |
| BLU-RAY | — | — | — | — |

Figure 9:
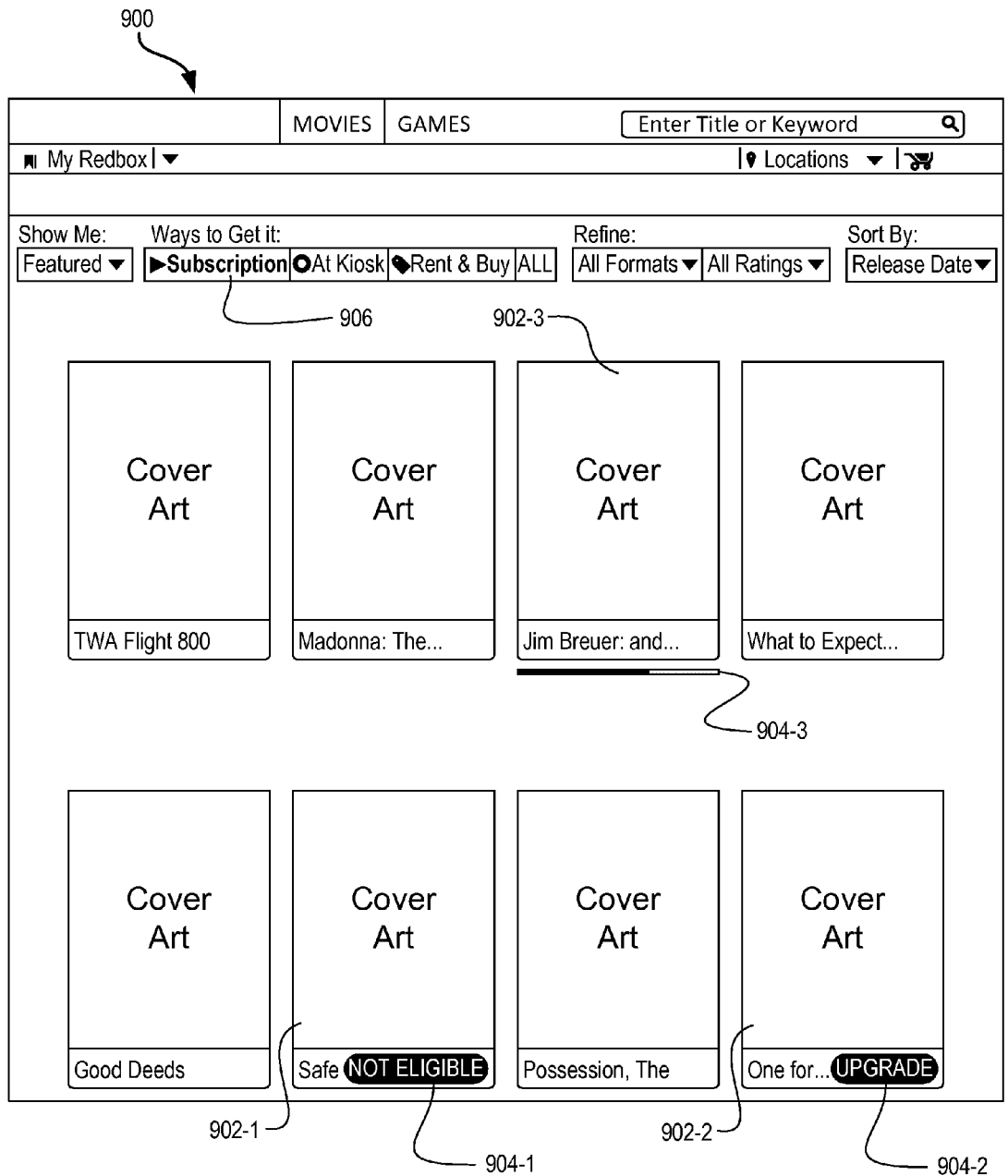

Table 3 shows exemplary accessibility indicators and/or status indicators that may be provided for display in subscription-based browse views. In certain examples, user interface facility 106 may determine that a particular media program is not accessible through a subscription of user 204. To illustrate, FIG. 9 shows an exemplary "subscription" browse view (subscriber) 900, which may include a plurality of cover art image objects 902 (e.g., cover art image objects 902-1 through 902-3) that are provided together with accessibility indicators 904 (e.g., accessibility indicators 904-1 and 904-2). User 204 may access the "subscription" browse view (subscriber) through, for example, a user selection of a user-selectable graphical object 906 illustrated in FIG. 9. As illustrated in FIG. 9, user interface facility 206 may select a "Not Eligible" icon as accessibility indicator 904-1 to be provided for display together with the cover art image object 902-1 based on the media program represented by cover art image object 902-1 not being available through a current subscription of user 204.

In certain examples, user interface facility 106 may select an accessibility indicator to be provided for display together with a cover art image object of a media program based on different subscription tiers that may be available through media service 102. As shown in Table 3, some exemplary subscription tiers may include a "primary subscription tier," a "media program provider subscription tier," and a "kids subscription tier." The "primary subscription tier" may include media programs associated with, for example, a base subscription provided through media service 102. The "media program provider subscription tier" may include media programs provided exclusively through a particular media program provider (e.g., HBO, Starz, etc.). The "kids subscription tier" may include a plurality of media programs directed towards children. For example, user interface facility 106 may determine that a particular program is accessible through a "kids subscription tier." Based on this determination, user interface facility 106 may provide any suitable "kids subscription tier" icon as accessibility indicator 904-2 for display together with cover art image object 902-2. The accessibility indicator 904-2 may notify user 204 that the media program may be available through, for example, an upgrade in subscription.

Similar to other examples described herein, a progress bar may be provided for display together with one or more of the cover art image objects illustrated in FIG. 9. For example, if user 204 previously viewed a portion of the media program represented by cover art image object 902-3, user interface facility 106 may provide a progress bar status indicator 904-3 for display together with cover art image object 902-1, as shown in FIG. 9.

The "subscription" browse view (unsubscribed) may be similar to the "subscription" browse view (subscriber) illustrated in FIG. 9 except that the "subscription" browse view (unsubscribed) may not include certain accessibility indicators and/or status indicators that may be included in the "subscription" browse view (subscriber). For example, a status indicator corresponding to a "Not Eligible" icon may not be provided for display in the "subscription" browse view (unsubscribed) because such a view is not associated with a particular subscription.

In certain examples, user interface facility 106 may provide, for display, other browse views as well as views that may be associated with browse views to facilitate user 204 determining options for accessing media programs available through media service 102. Such other browse views may include a location-based browse view such as a "location" (kiosk) browse view and a "homepage" browse view. Views that are associated with browse views may include, for example, a "fly out" view, which may include a pop-up window or magnified view that may include additional information about a media program represented by a cover art image object in a browse view. Examples of how the accessibility and/or status indicators may be provided together with cover art image objects in the "location" (kiosk) browse view, the "homepage" browse view, and the "fly out" view are provided with reference to Table 4, shown below.

TABLE 4

| Accessibility/Status Indicator Name | "Location"(Kiosk) Browse View | | "Fly-out" View | | "Homepage" Browse View | |
|---|---|---|---|---|---|---|
| | Type | Priority | Type | Priority | Type | Priority |
| Purchased | RIBBON | 1 | RIBBON | 1 | RIBBON | 1 |
| Progress Bar | BAR | 1 | BAR | 1 | BAR | 1 |
| Star Rating | STARS | 1 | STARS | 1 | STARS | 1 |
| Tomatometer | — | — | LOGO | 1 | — | — |
| Media Content Provider | — | — | LOGO | 1 | — | — |
| Expires in <days>, <hours> | RIBBON | 2 | RIBBON | 2 | RIBBON | 2 |
| Awaiting Pickup | RIBBON | 3 | RIBBON | 3 | RIBBON | 3 |
| Disc At Home | RIBBON | 4 | RIBBON | 4 | RIBBON | 4 |
| Last Chance | RIBBON | 5 | RIBBON | 5 | RIBBON | 5 |
| Now Available | RIBBON | 6 | RIBBON | 6 | RIBBON | 6 |
| Special Pricing | RIBBON | 7 | RIBBON | 7 | RIBBON | 7 |
| Digital Exclusive | RIBBON | 8 | RIBBON | 8 | RIBBON | 8 |
| Bookmarked | RIBBON | 9 | RIBBON | 9 | RIBBON | 9 |
| Coming Soon | — | — | — | — | — | — |
| 10-Minute Preview | RIBBON | 10 | RIBBON | 10 | RIBBON | 10 |
| Most Popular | RIBBON | 11 | — | — | RIBBON | 11 |
| Back Again | RIBBON | 12 | — | — | RIBBON | 12 |
| Not Eligible | — | — | ICON | Yes | ICON | Yes |
| Primary Subscription Tier | — | — | ICON | Yes | ICON | Yes |
| Starz Subscription Tier | — | — | ICON | Yes | ICON | Yes |
| Kids Subscription Tier | — | — | ICON | Yes | ICON | Yes |
| At the Box | — | — | ICON | Yes | ICON | Yes |
| Rent/Buy | — | — | ICON | Yes | ICON | Yes |
| Streamable | — | — | ICON | Yes | ICON | Yes |

TABLE 4-continued

| Accessibility/Status Indicator Name | "Location"(Kiosk) Browse View | | "Fly-out" View | | "Homepage" Browse View | |
|---|---|---|---|---|---|---|
| | Type | Priority | Type | Priority | Type | Priority |
| Pricing | — | — | ICON | Yes | ICON | Yes |
| BLU-RAY | ICON | Yes | ICON | Yes | ICON | Yes |

Table 4 shows exemplary accessibility indicators and/or status indicators that may be provided in the "location" (kiosk) browse view. The "location" (kiosk) browse view may correspond to a view that shows media programs that may be available at one or more media vending kiosks 216. For example, user 204 may, through a user preference control user interface, indicate that the media vending kiosk 216-2 is a preferred kiosk location. As a result, the user interface facility 106 may provide, for display, cover art image objects corresponding to media programs that are available at the media vending kiosk 216-2. The "location" (kiosk) browse view may include accessibility indicators and/or status indicators similar to the examples discussed with respect to the "at kiosk" browse view illustrated in FIG. 7.

The "homepage" browse view may correspond to a view that may be provided for display by user interface facility 106 when a user initially accesses a media service user interface provided through media service 102. From the "homepage" browse view, a user may be able to conduct searches for media programs and access any of the other views described herein. The "homepage" browse view may include content and/or information tailored to a specific user (i.e., if user 204 is logged in). In some examples, the "homepage" browse view may display a plurality of cover art image objects arranged in a grid in any suitable manner. The exemplary accessibility indicators and/or status indicators shown in Table 4 may be selected and provided by user interface facility 106 for display together with cover art image objects in the homepage browse view in any suitable manner.

Figure 10:
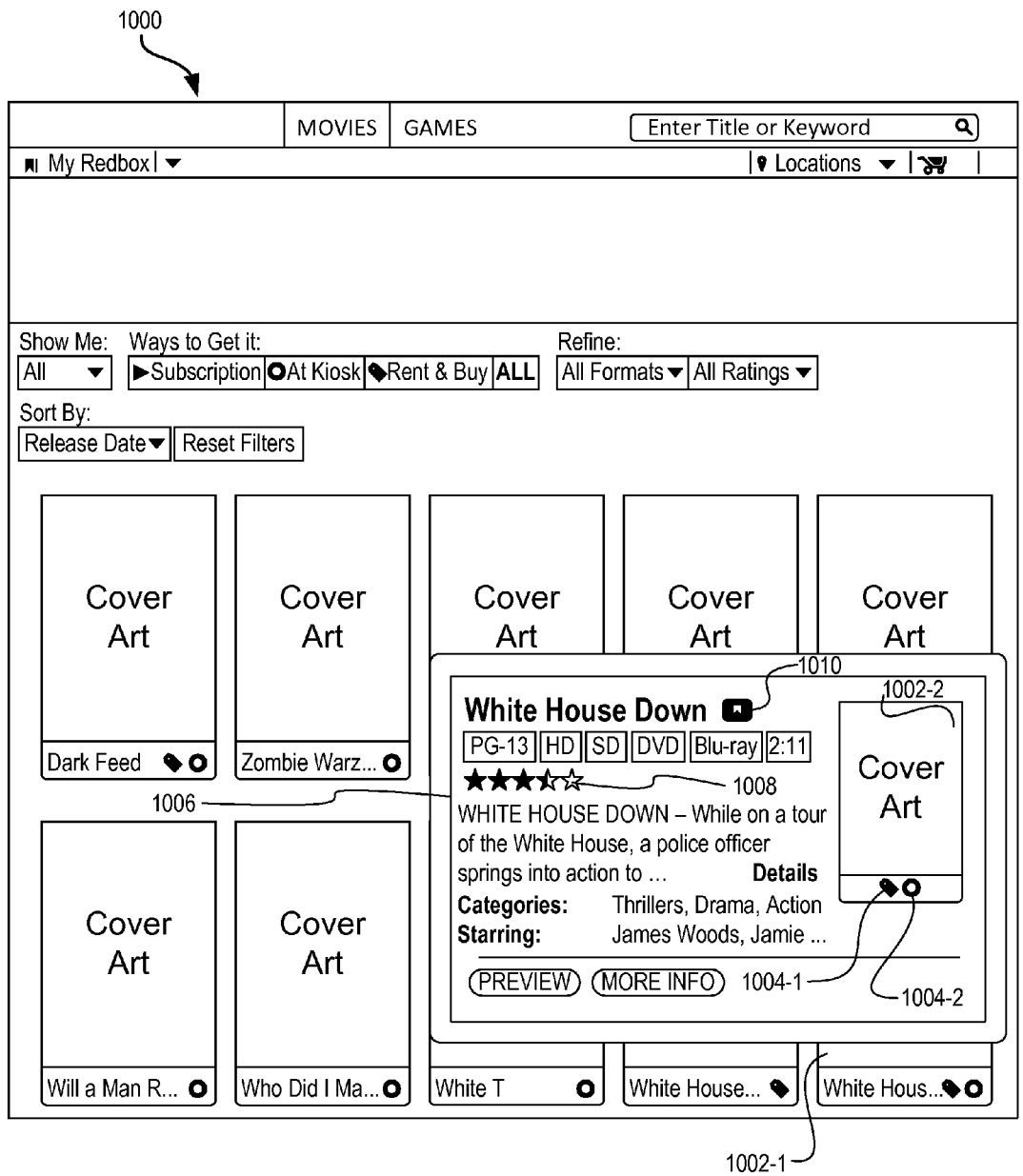

User interface facility 106 may provide, for display, the "fly out" view based on a user action with respect to a particular cover art image object. For example, the "fly out" view may correspond to a pop-up window that is presented based on user 204 scrolling over a particular cover art image object. User 204 may scroll over the cover art images in any suitable manner such as through a gesture on a touch screen interface and/or by moving a pointer icon over the cover art image object. Each cover art image object may have a unique "fly out" view that includes information that is specific to the media program represented by the cover art image object. Such information in the "fly out" views may include one or more of the exemplary accessibility and/or status indicators shown in Table 4. To illustrate, FIG. 10 shows an exemplary "fly out" view 1000 including a fly out window 1006 that is specific to a media program titled "White House Down." User 204 may access the fly out window 1006 by, for example, moving a pointer icon over cover art image object 1002-1. As seen in FIG. 10, fly out window 1006 includes accessibility indicators 1004-1 and 1004-2 provided together with another cover art image object 1002-2 representing the media program. The accessibility indicator 1004-1 corresponds to a ticket icon, which may indicate that the media program represented by the cover art image objects 1002-1 and 1002-2 may be available to rent or purchase through, for example, a transactional-based and digital channel-based distribution model. The accessibility indicator 1004-2 corresponds to a disc icon, which may indicate that the media program represented by the cover art image objects 1002-1 and 1002-2 may be available to rent or purchase through, for example, one of the media vending kiosks 216. In addition to the accessibility indicators 1004-1 and 1004-2, fly out window 1006 may include other information associated with the media program such as an indicator in the form of a "Star Rating" icon 1008 and a "Bookmark" option 1010 selectable by user 204 to bookmark the media program. Although the fly out window 1006 is shown in a browse view in FIG. 10, it is understood that user interface facility 106 may provide, for display, a fly out window based on a user action in any view that includes a cover art image object representing a media program.

As mentioned, in some examples, the user interface facility 106 may be configured to provide, for display, any of the accessibility indicators and/or the status indicators described herein in views other than the browse views described above. For example, user interface facility 106 may provide the accessibility indicators and/or the status indicators for display in a "media content provider" view, a "kids" view, a personalized interface "reminders" view, a personalized interface "watch history" view, a personalized interface "bookmarks" view, a personalized interface "purchases" view, an information view of a media program, and a "homepage" (promotions) view. Specific examples of how the user interface facility 106 may provide the accessibility indicators and/or the status indicators together with a cover art image object representing a media program in these other views are provided with reference to Tables 5-8, shown below.

In certain examples, user interface facility 106 may be configured to track and use the statuses of media programs with respect to a user to generate a user interface personalized for the user. User interface facility 106 may be configured to track the statuses of media programs with respect to a user in any suitable way. As an example, the tracking may include user interface facility 106 accessing media program status information in a user account to determine statuses of media programs with respect to the user represented by the user account. Such accessing may be performed at any suitable time, such as periodically in accordance with a predefined access schedule or dynamically in response to an occurrence of a predefined access trigger event (e.g., in response to a user request for a personalized user interface or a particular view of the personalized user interface). Based on the accessed information, user interface facility 106 may be configured to provide personalized user interface views such as a personalized interface "Watch History" view, a personalized interface "Purchases" view, a personalized interface "Reminders" view, and a personalized interface "Bookmarks" view. Examples of a personalized interface "Watch History" view and a personalized interface "Purchases" view are described with respect to Table 5, shown below.

TABLE 5

| Accessibility/<br>Status Indicator Name | Personalized Interface "Watch History" View | | Personalized Interface "Purchases" View | |
|---|---|---|---|---|
| | Type | Priority | Type | Priority |
| Purchased | RIBBON | 1 | — | — |
| Progress Bar | BAR | 1 | BAR | 1 |
| Star Rating | STARS | 1 | STARS | 1 |
| Tomatometer | — | — | — | — |
| Media Program Provider | — | — | — | — |
| Expires in <days>, <hours> | RIBBON | 2 | — | — |
| Awaiting Pickup | — | — | — | — |
| Disc At Home | — | — | — | — |
| Last Chance | RIBBON | 3 | — | — |
| Now Available | — | — | — | — |
| Special Pricing | RIBBON | 4 | — | — |
| Digital Exclusive | RIBBON | 5 | — | — |
| Bookmarked | — | — | — | — |
| Coming Soon | — | — | — | — |
| 10-Minute Preview | RIBBON | 6 | — | — |
| Most Popular | — | — | — | — |
| Back Again | — | — | — | — |
| Not Eligible | ICON | Yes | — | — |
| Primary Subscription Tier | ICON | Yes | — | — |
| Media Program Provider Subscription Tier | ICON | Yes | — | — |
| Kids Subscription Tier | ICON | Yes | — | — |
| At the Box | ICON | Yes | — | — |
| Rent/Buy | ICON | Yes | — | — |
| "Streamable" | ICON | Yes | — | — |
| Pricing | ICON | Yes | — | — |
| BLU-RAY | ICON | Yes | — | — |

TABLE 6

| Accessibility/<br>Status Indicator Name | Personalized Interface "Reminders" View | | Personalized Interface "Bookmarks" View | |
|---|---|---|---|---|
| | Type | Priority | Type | Priority |
| Purchased | — | — | RIBBON | 1 |
| Progress Bar | BAR | 1 | BAR | 1 |
| Star Rating | STARS | 1 | STARS | 1 |
| Tomatometer | — | — | — | — |
| Media Program Provider | — | — | — | — |
| Expires in <days>, <hours> | RIBBON | 2 | RIBBON | 2 |
| Awaiting Pickup | RIBBON | 3 | RIBBON | 3 |
| Disc At Home | RIBBON | 4 | RIBBON | 4 |
| Last Chance | RIBBON | 5 | RIBBON | 5 |
| Now Available | RIBBON | 6 | — | — |
| Special Pricing | RIBBON | 7 | RIBBON | 6 |
| Digital Exclusive | RIBBON | 8 | RIBBON | 7 |
| Bookmarked | — | — | — | — |
| Coming Soon | — | — | RIBBON | 8 |
| 10-Minute Preview | RIBBON | 9 | RIBBON | 9 |
| Most Popular | — | — | — | — |
| Back Again | — | — | — | — |
| Not Eligible | ICON | Yes | ICON | Yes |
| Primary Subscription Tier | ICON | Yes | ICON | Yes |
| Media Program Provider Subscription Tier | ICON | Yes | ICON | Yes |
| Kids Subscription Tier | ICON | Yes | ICON | Yes |
| At the Box | — | — | ICON | Yes |
| Rent/Buy | — | — | ICON | Yes |
| Streamable | — | — | ICON | Yes |
| Pricing | — | — | ICON | Yes |
| BLU-RAY | — | — | ICON | Yes |

The personalized interface "Watch History" view may include a grid of cover art image objects representing media programs previously consumed either fully or partially by user 204. The personalized interface "Watch History" view may also include personalized user interface content indicative of consumption progress statuses (e.g., progress bars) of media programs with respect to user 204. Each of the cover art image objects may be provided together with one or more of the exemplary accessibility indicators and/or status indicators listed in Table 5 in any suitable manner.

The personalized interface "Purchases" view may include a grid of cover art image objects representing media programs that were purchased by user 204 through, for example, a transactional-based and digital channel-based distribution model. Each of the cover art image objects may be provided together with one or more of the exemplary accessibility indicators and/or status indicators listed in Table 5 in any suitable manner. As shown in Table 5, the accessibility indicators and/or status indicators applicable to the "Purchases" view may include a "Progress Bar" indicator and a "Star Rating" indicator. However, other accessibility indicators and/or status indicators may be provided for display in the personalized "Purchases" view as may suit a particular implementation.

Examples of a personalized interface "Reminders" view and a personalized interface "Bookmarks" view are described with respect to Table 6, shown below.

The personalized "Reminders" view may include personalized user interface content representative of one or more media programs that have been identified as being associated with reminders to be presented to the user. The personalized "Reminders" view may include a grid of cover art image objects provided together with accessibility indicators and/or status indicators that include reminder information to be presented to the user.

User interface facility 106 may be configured to identify media programs and associated reminders for inclusion in the personalized "Reminders" view in any suitable way. For example, user interface facility 106 may determine that one or more of the exemplary accessibility indicators and/or status indicators listed in Table 6 correspond to a reminder to be provided in the personalized "Reminders" view. Examples of such accessibility indicators and/or status indicators and how they may be associated with cover art image objects in the personalized "Reminders" view will now be described.

In certain examples, user interface facility 106 may be configured to select cover art image objects to which the accessibility indicator "Awaiting Pickup" is applicable to provide in the personalized "Reminders" view. As such, user 204 may be reminded through the personalized "Reminders" view of any media programs that are ready for pickup from, for example, a selected media vending kiosk 216. User interface facility 106 may be configured to remove the "Awaiting Pickup" accessibility indicator, and the associated cover art image object, from the personalized "Reminders" view when a physical copy of the media program is picked up by the user 204 (e.g., from a media vending kiosk 216) or after a predetermined length of time that the accessibility indicator has been included in the personalized "Reminders" view.

In certain examples, user interface facility 106 may be configured to select cover art image objects to which the accessibility indicator "Disc at Home" is applicable to include in the personalized "Reminders" view. Such an accessibility indicator may remind user 204 that a copy of the media program is in the possession of the user (e.g., the physical copy of the media program has been pickup up from a media vending kiosk but not yet returned to a media vending kiosk). User interface facility 106 may be configured to remove the "Disc at Home" accessibility indicator (as well as the associated cover art image object) from the personalized "Reminders" view when the physical copy of the media program is returned to a media vending kiosk or after a predetermined length of time that the reminder has been included in the personalized "Reminders" view.

The personalized "Bookmarks" view may include personalized user interface content representative of one or more media programs that have been identified as being bookmarked by the user. The personalized "Bookmarks" view may include a scrollable grid of cover art image objects provided together with any suitable bookmarked indicator as well as one or more other accessibility indicators and/or status indicators. The cover art image objects included in the personalized "Bookmarks" view may include any of the exemplary accessibility indicators and/or status indicators listed in Table 6 in any suitable manner.

Table 7 shows various other views in which the accessibility indicators and/or status indicators described herein may be displayed together with cover art image objects. In particular, user interface facility 106 may provide the accessibility indicators and/or status indicators in a "search results" view, an "information" view, and/or a "homepage" (promotion) view. Examples of how accessibility indicators and/or status indicators may be provided for display in each of these views are described with respect to Table 7, shown below.

TABLE 7

| Accessibility/Status Indicator Name | "Search Results" View | | "Information" View | | "Homepage" (Promotions) View | |
|---|---|---|---|---|---|---|
| | Type | Priority | Type | Priority | Type | Priority |
| Purchased | RIBBON | 1 | RIBBON | 1 | — | — |
| Progress Bar | BAR | 1 | BAR | 1 | — | — |
| Star Rating | STARS | 1 | STARS | 1 | — | — |
| Tomatometer | — | — | LOGO | 1 | — | — |
| Media Program Provider | — | — | LOGO | 1 | — | — |
| Expires in <days>, <hours> | RIBBON | 2 | RIBBON | 2 | — | — |
| Awaiting Pickup | RIBBON | 3 | RIBBON | 3 | — | — |
| Disc At Home | RIBBON | 4 | RIBBON | 4 | — | — |
| Last Chance | RIBBON | 5 | RIBBON | 5 | — | — |
| Now Available | — | — | RIBBON | 6 | — | — |
| Special Pricing | RIBBON | 6 | RIBBON | 7 | RIBBON | 2 |
| Digital Exclusive | RIBBON | 7 | RIBBON | 8 | RIBBON | 2 |
| Bookmarked | RIBBON | 8 | RIBBON | 9 | — | — |
| Coming Soon | — | — | RIBBON | 10 | — | — |
| 10-Minute Preview | RIBBON | 9 | RIBBON | 11 | — | — |
| Most Popular | — | — | — | — | — | — |
| Back Again | — | — | — | — | — | — |
| Not Eligible | ICON | Yes | ICON | Yes | ICON | Yes |
| Primary Subscription Tier | ICON | Yes | ICON | Yes | ICON | Yes |
| Media Program Provider Subscription Tier | ICON | Yes | ICON | Yes | ICON | Yes |
| Kids Subscription Tier | ICON | Yes | ICON | Yes | ICON | Yes |
| At the Box | ICON | Yes | ICON | Yes | ICON | Yes |
| Rent/Buy | — | — | ICON | Yes | ICON | Yes |
| Streamable | ICON | Yes | ICON | Yes | ICON | Yes |
| Pricing | ICON | Yes | ICON | Yes | ICON | Yes |
| BLU-RAY | ICON | Yes | ICON | Yes | — | — |

In certain examples, user interface facility 106 may provide, for display, a "search results" view including a grid of cover art image objects representing media programs found based on a search initiated by user 204. The search may be based on any one or a combination of a search terms such as a specific genre, category, available format, release date, rating, distribution model, etc. associated with media programs. For example, user 204 may select in any suitable manner to search for media programs associated with, for example, a "comedy" genre. In response, user interface facility 106 may provide one or more of the accessibility indicators and/or status indicators listed in Table 7 for display together with the cover art image objects of media programs representing comedies in the "search results" view. In another example, the search may be based on a specific format (e.g., DVD or BD) of media programs available through media service 102. In response, user interface facility 106 may provide one or more of the accessibility indicators and/or status indicators listed in Table 7 for display together with the cover art image objects of media programs that are available in the specific format in the "search results" view.

In certain examples, user interface facility 106 may provide an "information" view for display. The "information" view may be provided for display by user interface facility 106 in response to a user request for information about a particular media program. For example, user interface facility 106 may detect a user request, received through a media service user interface, for information about a media program and respond to the request by providing the "information" view for display. The "information" view may include a cover art image object representing the media program, as well as other information about the media program such as a title and synopsis of the media program and information regarding the genre, cast, director, studio, ratings, and available formats of the media program. User interface facility 106 may also provide, for display in the "information" view, one or more of the exemplary accessibility indicators and/or status indicators listed in Table 7 in any suitable manner.

In certain examples, the "information" view may also include a status indicator that provides an indication of how a particular media program was received by users and/or media program critics (i.e., a rating of the media program). Such a status indicator may correspond to the "Tomatometer" listed, for example, in Table 7, which "Tomatometer" may be displayed as a logo together with a cover art image object representing the media program. The "Tomatometer" logo provided for display by user interface facility 106 may vary depending on a "Tomatometer" rating attributed to the media program. For example, a favorable rating associated with the media program may result in the "Tomatometer" logo being provided for display as a red tomato. Alternatively, an unfavorable "Tomatometer" rating of the media program may result in the "Tomatometer" logo being provided for display as a green tomato. The red tomato logo and the green tomato logo examples are illustrative only. Other logos for the "Tomatometer" may be provided for display as may suit a particular implementation. In addition to the logo, the "Tomatometer" status indicator may include a numerical percentage value associated with the "Tomatometer" rating. For example, a value of ninety percent (90%) may be provided together with a red tomato "Tomatometer" logo indicating that the media program has a favorable "Tomatometer" rating.

Figure 11:
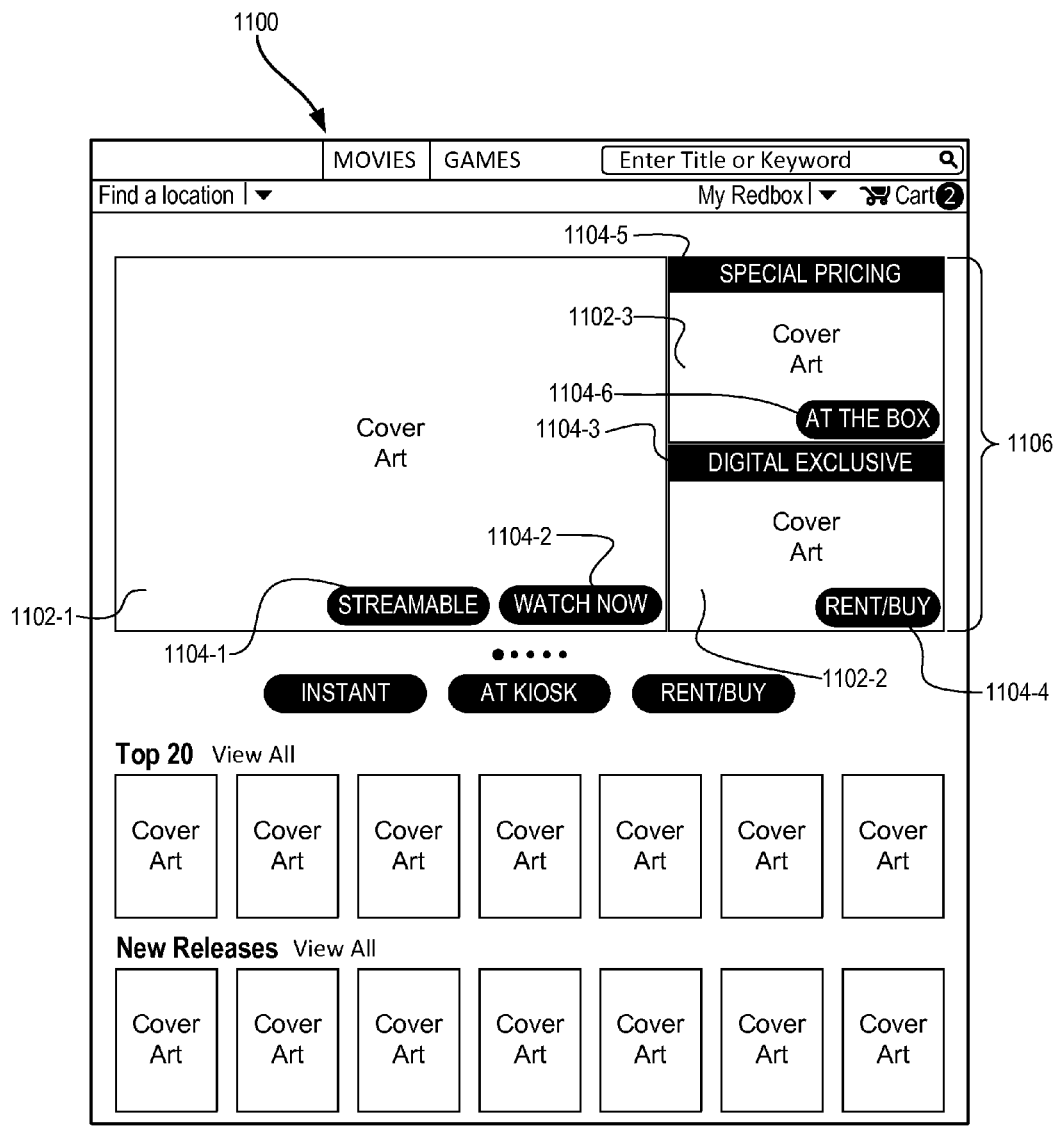

In certain examples, user interface facility 106 may provide, for display, a "homepage" (promotions) view, which may include a grid of cover art image objects selected based on promotional content to be provided to user 204. User interface facility 106 may select the cover art image objects to be included in the "homepage" (promotions) view in any suitable manner. The cover art image objects selected to be included in the "homepage" (promotions) view may include any cover art image objects representing media programs for which a promotion is available or will become available through media service 102 within a predetermined amount of time. User interface facility 106 may select one or more of the accessibility indicators and/or status indicators shown in Table 7 to provide for display together with the cover art image objects based on the promotions. To illustrate, FIG. 11 shows an exemplary "homepage" (promotions) view 1100 in which certain cover art image objects 1102 (e.g., cover art image objects 1102-1 through 1102-3) are provided for display in a grid in a promotions section 1106. Cover art image objects 1102-1 through 1102-3 may be selected based on promotions associated with the media programs that they represent.

One or more of the accessibility indicators and/or status indicators 1104 (e.g., accessibility indicators 1104-1 through 1104-6) illustrated in FIG. 11 may be provided for display together with cover art image objects 1102-1 through 1102-3. For example, user interface facility 106 may select cover art image object 1102-1 to include in the promotions section 1106 to promote the media program being "Streamable" by way of a digital channel-based distribution model. Accordingly, user interface facility 106 may provide the "Streamable" accessibility indicator 1104-1 as well as the "Watch Now" accessibility indicator 1104-2 as icons for display together with the cover art image object 1102-1 in the promotion section 1106 of the "homepage" (promotions) view 1100. In another example, user interface facility 106 may determine that the media program represented by the cover art image object 1102-2 is exclusively available through a digital channel-based distribution model. Accordingly, user interface facility 106 may provide, for example, the "Digital Exclusive" accessibility indictor 1104-3 as a ribbon and the "Rent/Buy" accessibility indicator 1104-4 as an icon for display together with the cover art image object of the media program in the promotions section 1106 of the "homepage" (promotions) view 1100. In another example, user interface facility 106 may determine that a special pricing promotion applies to the media program represented by cover art image object 1102-3, and that the media program is available through a transactional-based and physical channel-based distribution model. Accordingly, user interface facility 106 may select the "Special Pricing" accessibility indicator 1104-5 as a ribbon and the "At the Box" accessibility indicator 1104-6 as an icon to be provided for display together with the cover art image object 1102-3 in the promotions section 1106 of the "homepage" (promotions) view.

In certain examples, user interface facility 106 may provide the accessibility indicators and/or status indicators described herein for display in views associated with a particular media program provider and/or associated with a particular age demographic. For example, user interface facility 106 may provide the accessibility indicators and/or status indicators described herein in a "media program provider" view and/or in a "kids" view. Examples of how the accessibility indicators and/or status indicators may be provided for display in such views are described with reference to Table 8, shown below.

TABLE 8

| Accessibility/Status Indicator Name | "Media Program Provider" View | | "Kids" View | |
|---|---|---|---|---|
| | Type | Priority | Type | Priority |
| Purchased | RIBBON | 1 | RIBBON | 1 |
| Progress Bar | BAR | 1 | BAR | 1 |
| Star Rating | STARS | 1 | STARS | 1 |
| Tomatometer | — | — | — | — |
| Media Program Provider | — | — | — | — |
| Expires in <days>, <hours> | RIBBON | 2 | RIBBON | 2 |
| Awaiting Pickup | RIBBON | 3 | RIBBON | 3 |
| Disc At Home | RIBBON | 4 | RIBBON | 4 |
| Last Chance | RIBBON | 5 | RIBBON | 5 |
| Now Available | RIBBON | 6 | RIBBON | 6 |
| Special Pricing | RIBBON | 7 | RIBBON | 7 |
| Digital Exclusive | RIBBON | 8 | RIBBON | 8 |
| Bookmarked | RIBBON | 9 | RIBBON | 9 |
| Coming Soon | — | — | — | — |
| 10-Minute Preview | RIBBON | 10 | RIBBON | 10 |
| Most Popular | — | — | — | — |
| Back Again | — | — | — | — |
| Not Eligible | ICON | Yes | ICON | Yes |
| Primary Subscription Tier | — | — | — | — |
| Media Program Provider Subscription Tier | — | — | — | — |

TABLE 8-continued

| Accessibility/Status Indicator Name | "Media Program Provider" View | | "Kids" View | |
|---|---|---|---|---|
| | Type | Priority | Type | Priority |
| Kids Subscription Tier | — | — | — | — |
| At the Box | — | — | — | — |
| Rent/Buy | — | — | — | — |
| Streamable | — | — | — | — |
| Pricing | — | — | — | — |
| BLU-RAY | — | — | — | — |

In certain examples, user interface facility 106 may provide, for display, the "media program provider" view in response to a user request to view media programs available from a specific media content provider (e.g., Starz, HBO, etc.). The "media program provider" view may be selected by user 204 in any suitable manner. Based on the selection, user interface facility 106 may provide, for display, a grid of cover art image objects representing media programs accessible through the media content provider as well as one or more of the exemplary accessibility indicators and/or status indicators listed in Table 8 in any suitable manner.

As mentioned, user interface facility 106 may provide the accessibility indicators and/or status indicators described herein for display in a view associated with a particular age demographic. To illustrate, user 204 may select in any suitable manner to view media programs specifically directed towards children. Accordingly, user interface facility 106 may provide, for display, the "kids" view, which may include a grid of cover art images representing media programs directed to children as well as one or more of the exemplary accessibility and/or status indicators listed in Table 8 in any suitable manner.

Figure 12:
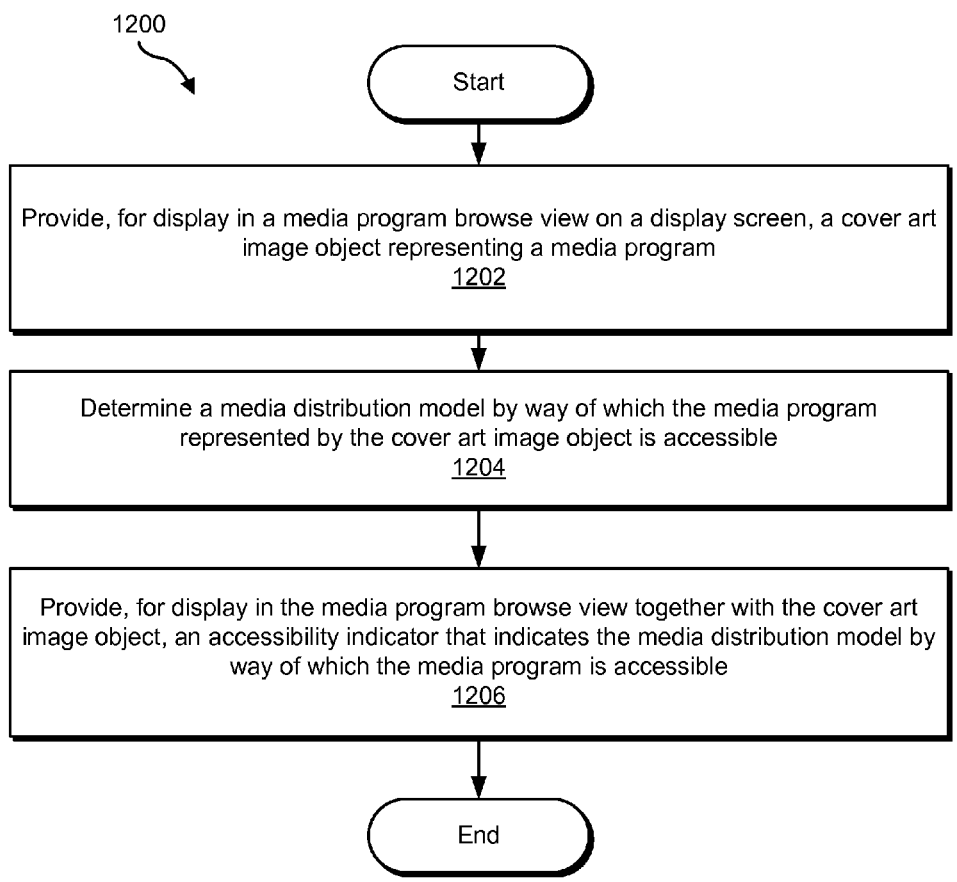
FIG. 12 illustrates an exemplary method for presenting media program accessibility information in a browse view according to principles described herein.

FIG. 12 illustrates an exemplary method 1200 for presenting media program accessibility information. While FIG. 12 illustrates exemplary steps according to one embodiment, other embodiments may omit, add to, reorder, combine, and/or modify any of the steps shown in FIG. 12. In certain embodiments, one or more of the steps shown in FIG. 12 may be performed by one or more components of the media service provider system 100 and/or implementations thereof.

In step 1202, a media service provider system may provide, for display in a media program browse view on a display screen, a cover art image object representing a media program, such as described herein. For example, the media service provider system may provide the cover art image object within a grid of cover art image objects representing a plurality of media programs accessible through a media program distribution service, such as described herein.

In step 1204, the media service provider system may determine a media distribution model by way of which the media program represented by the cover art image object is accessible (e.g., through the media program distribution service), such as described herein.

In step 1206, the media service provider system may provide, for display in the media program browse view together with the cover art image object, an accessibility indicator that indicates the media distribution model by way of which the media program is accessible, such as described herein.

Figure 13:
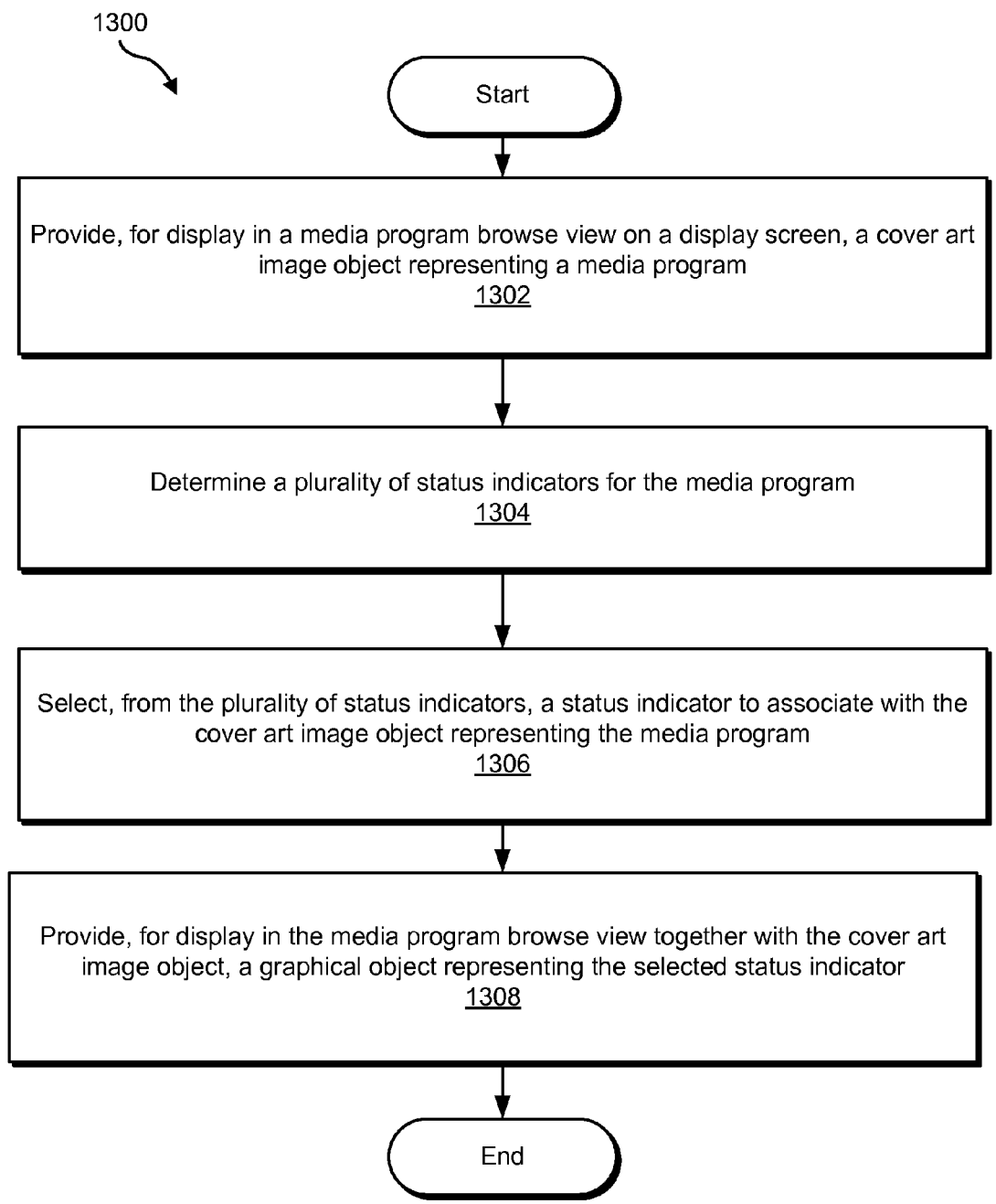
FIG. 13 illustrates another exemplary method for presenting media program accessibility information in a browse view according to principles described herein.

FIG. 13 illustrates an exemplary method 1300 for presenting media program accessibility information. While FIG. 13 illustrates exemplary steps according to one embodiment, other embodiments may omit, add to, reorder, combine, and/or modify any of the steps shown in FIG. 13. In certain embodiments, one or more of the steps shown in FIG. 13 may be performed by one or more components of the media service provider system 100 and/or implementations thereof.

In step 1302, a media service provider system may provide, for display in a media program browse view on a display screen, a cover art image object representing a media program, such as described herein. For example, the media service provider system may provide the cover art image object within a grid of cover art image objects representing a plurality of media programs accessible through a media program distribution service, such as described herein.

In step 1304, the media service provider system may determine a plurality of status indicators for the media program, such as described herein. In certain examples, the plurality of status indicators may be respectively associated with a plurality of media distribution models by way of which the media program represented by the cover art image object is accessible through the media program distribution service, such as described herein.

In step 1306, the media service provider system may select, from the plurality of status indicators, a status indicator to associate with the cover art image object representing the media program, such as described herein.

In step 1308, the media service provider system may provide, for display in the media program browse view together with the cover art image object, a graphical object representing the selected status indicator, such as described herein.

Figure 14:
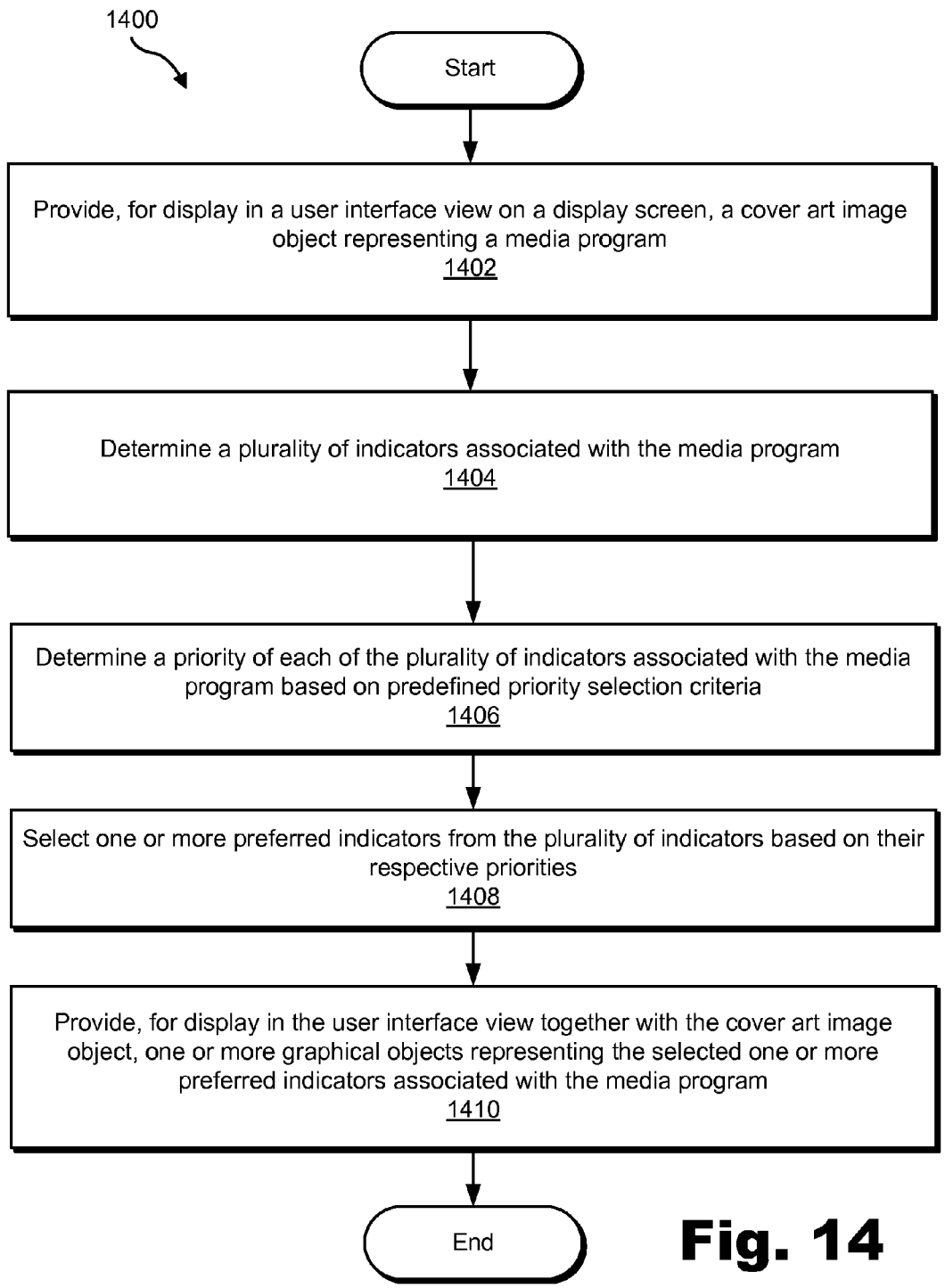
FIG. 14 illustrates another exemplary method for presenting media program accessibility information in a user interface view according to principles described herein.

FIG. 14 illustrates an exemplary method 1400 for presenting media program accessibility information. While FIG. 14 illustrates exemplary steps according to one embodiment, other embodiments may omit, add to, reorder, combine, and/or modify any of the steps shown in FIG. 14. In certain embodiments, one or more of the steps shown in FIG. 14 may be performed by one or more components of the media service provider system 100 and/or implementations thereof.

In step 1402, a media service provider system may provide, for display in a user interface view on a display screen, a cover art image object representing a media program, such as described herein. For example, the media service provider system may provide the cover art image object within a grid of cover art image objects representing a plurality of media programs accessible through a media program distribution service, such as described herein.

In step 1404, the media service provider system may determine a plurality of indicators associated with the media program, such as described herein. In certain examples, the plurality of indicators may be respectively associated with a plurality of media distribution models by way of which the media program represented by the cover art image object is accessible through the media program distribution service, such as described herein.

In step 1406, the media service provider system may determine a priority of each of the plurality of indicators associated with the media program based on predefined priority selection criteria, such as described herein.

In step 1408, the media service provider system may select one or more preferred indicators from the plurality of indicators based on their respective priorities, such as described herein.

In step 1410, the media service provider system may provide, for display in the user interface view together with the cover art image object, one or more graphical objects representing the selected one or more preferred indicators associated with the media program, such as described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 15:
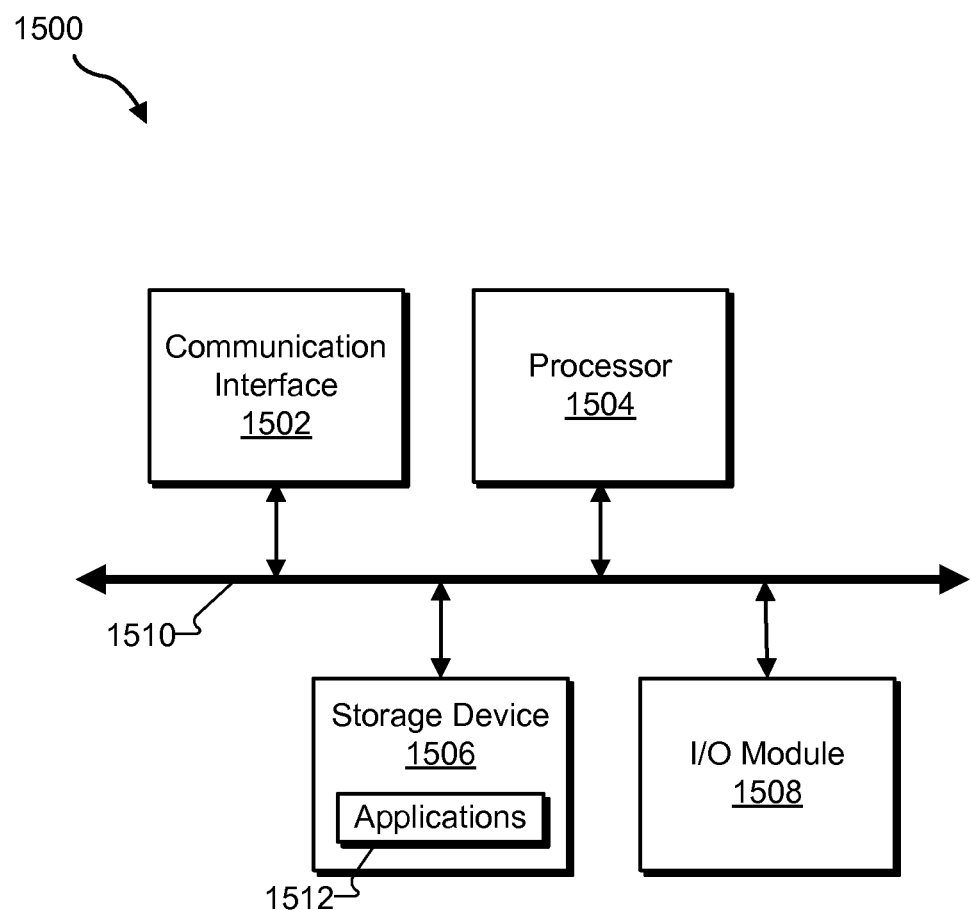
FIG. 15 illustrates an exemplary computing device according to principles described herein.

FIG. 15 illustrates an exemplary computing device 1500 that may be configured to perform one or more of the processes described herein. As shown in FIG. 15, computing device 1500 may include a communication interface 1502, a processor 1504, a storage device 1506, and an input/output (I/O) module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, and any other suitable interface. In at least one embodiment, communication interface 1502 may provide a direct connection between system 100 and one or more of provisioning systems via a direct link to a network, such as the Internet. Communication interface 1502 may additionally or alternatively provide such a connection through, for example, a local area network (such as an Ethernet network), a personal area network, a telephone or cable network, a satellite data connection, a dedicated URL, or any other suitable connection. Communication interface 1502 may be configured to interface with any suitable communication media, protocols, and formats, including any of those mentioned above.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, random access memory (RAM), dynamic RAM (DRAM), other non-volatile and/or volatile data storage units, or a combination or sub-combination thereof. Electronic data, including data described herein, may be temporarily and/or permanently stored in storage device 1506. For example, data representative of one or more executable applications 1512 (which may include, but are not limited to, one or more of the software applications described herein) configured to direct processor 1504 to perform any of the operations described herein may be stored within storage device 1506. In some examples, data may be arranged in one or more databases residing within storage device 1506.

I/O module 1508 may be configured to receive user input and provide user output and may include any hardware, firmware, software, or combination thereof supportive of input and output capabilities. For example, I/O module 1508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1500. For example, one or more applications 1512 residing within storage device 1506 may be configured to direct processor 1504 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary implementations have been described with reference to the accompanying drawings. It will, however, be evident that various modifications and changes may be made thereto, and additional implementations may be provided, without departing from the scope of the invention as set forth in the claims that follow. For example, certain features of one implementation described herein may be combined with or substituted for features of another implementation described herein. The description and drawings are accordingly to be regarded in an illustrative rather than a restrictive sense.

What is claimed is:

1. A method comprising:
    providing, by a media service provider system for display in a media program browse view on a display screen, a cover art image object representing a media program within a grid of cover art image objects representing a plurality of media programs accessible through a media program distribution service;
    determining, by the media service provider system, a media distribution model by way of which the media program represented by the cover art image object is accessible through the media program distribution service;
    providing, by the media service provider system and for display in the media program browse view together with the cover art image object, an accessibility indicator that indicates the media distribution model by way of which the media program is accessible and that is at least partially overlaid over the cover art image object;
    providing, by the media service provider system for display in an additional media program browse view on the display screen, the cover art image object representing the media program within an additional grid of cover art image objects representing an additional plurality of media programs accessible through the media program distribution service;
    selecting, by the media service provider system, a status indicator to associate with the cover art image object representing the media program in the additional media program browse view;
    providing, by the media service provider system and for display in the additional media program browse view together with the cover art image object, a graphical object representing the selected status indicator; and
    providing, by the media service provider system for display in the additional media program browse view together with the additional grid of cover art image objects, a plurality of user-selectable filter options representing a plurality of media distribution models,
    wherein the selected status indicator includes a bookmarked status that indicates that the media program has been bookmarked by a user and that follows and is displayed with the cover art image object regardless of which one of the plurality of user-selectable filter options representing the plurality of media distribution models is selected.

2. The method of claim 1, further comprising:
    providing, by the media service provider system for display in the media program browse view together with the cover art image object, an additional cover art image object representing an additional media program within the grid of cover art image objects;
    determining, by the media service provider system, an additional media distribution model by way of which the additional media program represented by the additional cover art image object is accessible through the media program distribution service; and
    providing, by the media service provider system and for display in the media program browse view together with the additional cover art image object, an additional accessibility indicator that indicates the additional media distribution model by way of which the additional media program is accessible.

3. The method of claim 2, wherein the additional media distribution model is different from the media distribution model.

4. The method of claim 1, wherein:
    the media distribution model comprises a digital media distribution model that utilizes a digital media distribution channel to distribute the media program; and
    the accessibility indicator indicates that the media program is accessible through the digital media distribution model.

5. The method of claim 4, wherein the accessibility indicator indicates one or more of an option to rent the media program, an option to buy the media program, and an option for subscription access to the media program.

6. The method of claim 5, wherein the accessibility indicator includes a textual notification at least partially overlaid over the cover art image object.

7. The method of claim 1, wherein:
    the media distribution model comprises a physical media distribution model that utilizes a kiosk-based distribution channel through which physical copies of the media program are distributed; and
    the accessibility indicator indicates that the media program is accessible through the kiosk-based distribution channel.

8. The method of claim 1, wherein the media programs represented in the grid of cover art image objects are accessible through the media program distribution service by way of a plurality of different media distribution models, the media distribution model included in the plurality of different media distribution models.

9. The method of claim 8, further comprising providing, by the media service provider system and in a same view on the display screen as the cover art image object, an additional accessibility indicator together with an additional cover art image object representing an additional media program, the additional accessibility indicator indicating an additional media distribution model included in the plurality of different media distribution models.

10. The method of claim 1, further comprising selecting, by the media service provider system, the accessibility indicator for inclusion in the media program browse view based on one or more media program access factors that include one or more of a user account subscription status, a media program content status, a user device capability, and an available media format of the media program.

11. The method of claim 1, further comprising providing, by the media service provider system and for display in the media program browse view together with the cover art image object and the accessibility indicator, a progress bar that indicates a progress status of a consumption of the media program by the user.

12. The method of claim 1, wherein the accessibility indicator includes an icon overlaid on the cover art image object.

13. The method of claim 1, embodied as computer-executable instructions on at least one non-transitory computer-readable medium.

14. A method comprising:
providing, by a media service provider system for display in a media program browse view on a display screen, a cover art image object representing a media program within a grid of cover art image objects representing a plurality of media programs accessible through a media program distribution service;
determining, by the media service provider system, a plurality of status indicators for the media program, the plurality of status indicators respectively associated with a plurality of media distribution models by way of which the media program represented by the cover art image object is accessible through the media program distribution service;
selecting, by the media service provider system from the plurality of status indicators, a status indicator to associate with the cover art image object representing the media program;
providing, by the media service provider system and for display in the media program browse view together with the cover art image object, a graphical object representing the selected status indicator and being at least partially overlaid over the cover art image object; and
providing, by the media service provider system for display in the media program browse view together with the grid of cover art image objects, a plurality of user-selectable filter options representing the plurality of media distribution models,
wherein the selected status indicator includes a bookmarked status that indicates that the media program has been bookmarked by a user and that follows and is displayed with the cover art image object regardless of which one of the plurality of user-selectable filter options representing the plurality of media distribution models is selected.

15. The method of claim 14, wherein:
the plurality of media distribution models comprises a digital media distribution model that utilizes a digital media distribution channel to distribute the media program and a physical media distribution model that utilizes a physical media distribution channel to distribute the media program.

16. The method of claim 14, wherein the plurality of status indicators are associated with a rental status of the media program, the bookmarked status of the media program, a subscription status of the media program, a physical location of a physical copy of the media program, and a time limit associated with accessing the media program.

17. The method of claim 14, further comprising providing, by the media service provider system and for display in the media program browse view together with the cover art image object and the graphical object representing the selected status indicator, a progress bar that indicates a progress status of a consumption of the media program by the user.

18. The method of claim 14, wherein the graphical object representing the selected status indicator includes a graphical representation of a ribbon that is displayed together with the cover art image object.

19. The method of claim 14, embodied as computer-executable instructions on at least one non-transitory computer-readable medium.

20. A system comprising:
a processor; and
a user interface facility that directs the processor to
provide, for display in a graphical user interface, a media program browse view including a grid comprising a plurality of cover art image objects representing a plurality of media programs,
determine a media distribution model by way of which a media program included in the plurality of media programs and represented by a cover art image object included in the plurality of cover art image objects is accessible through a media program distribution service,
provide, for display in the media program browse view together with the cover art image object representing the media program, an accessibility indicator that indicates the media distribution model by way of which the media program is accessible and that is at least partially overlaid over the cover art image object,
provide, for display in an additional media program browse view, the cover art image object representing the media program within an additional grid of cover art image objects representing an additional plurality of media programs accessible through the media program distribution service,
select a status indicator to associate with the cover art image object representing the media program in the additional media program browse view,
provide, for display in the additional media program browse view together with the cover art image object, a graphical object representing the selected status indicator, and
provide, for display in the additional media program browse view together with the additional grid of cover art image objects, a plurality of user-selectable filter options representing a plurality of media distribution models,
wherein the selected status indicator includes a bookmarked status that indicates that the media program has been bookmarked by a user and that follows and is displayed with the cover art image object regardless of which one of the plurality of user-selectable filter options representing the plurality of media distribution models is selected.

* * * * *